(12) United States Patent
Bookbinder et al.

(10) Patent No.: US 10,150,695 B2
(45) Date of Patent: *Dec. 11, 2018

(54) LOW LOSS OPTICAL FIBERS WITH FLUORINE AND CHLORINE CODOPED CORE REGIONS

(71) Applicant: Corning Incorporated, Corning, NY (US)

(72) Inventors: Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,648

(22) Filed: Aug. 29, 2017

(65) Prior Publication Data

US 2018/0002221 A1  Jan. 4, 2018

Related U.S. Application Data

(63) Continuation of application No. 15/096,821, filed on Apr. 12, 2016, now Pat. No. 9,802,858.

(Continued)

(51) Int. Cl.
*C03C 13/04* (2006.01)
*G02B 6/02* (2006.01)
(Continued)

(52) U.S. Cl.
CPC .......... *C03C 13/046* (2013.01); *C03B 37/014* (2013.01); *C03B 37/01446* (2013.01);
(Continued)

(58) Field of Classification Search
None
See application file for complete search history.

(56) References Cited

U.S. PATENT DOCUMENTS

| 4,222,631 A | 9/1980 | Olshansky |
| 5,410,567 A | 4/1995 | Brundage et al. |

(Continued)

FOREIGN PATENT DOCUMENTS

| EP | 0181595 A2 | 5/1986 |
| EP | 0479120 A2 | 4/1992 |
| EP | 2535319 A2 | 12/2012 |

OTHER PUBLICATIONS

International Search Report and Written Opinion of the International Searching Authority; PCT/US2016/026336; dated August 23, 2016; 17 Pages; European Patent Office.

(Continued)

*Primary Examiner* — Sung H Pak
(74) *Attorney, Agent, or Firm* — John P. Ciccarelli

(57) ABSTRACT

A co-doped optical fiber is provided having an attenuation of less than about 0.17 dB/km at a wavelength of 1550 nm. The fiber includes a core region in the fiber having a graded refractive index profile with an alpha of greater than 5. The fiber also includes a first cladding region in the fiber that surrounds the core region. Further, the core region has a relative refractive index of about −0.10% to about +0.05% compared to pure silica. In addition, the core region includes silica that is co-doped with chlorine at about 1.2% or greater by weight and fluorine between about 0.1% and about 1% by weight.

28 Claims, 8 Drawing Sheets

Related U.S. Application Data

(60) Provisional application No. 62/147,777, filed on Apr. 15, 2015.

(51) Int. Cl.
*G02B 6/028* (2006.01)
*G02B 6/036* (2006.01)
*C03C 3/06* (2006.01)
*C03B 37/014* (2006.01)

(52) U.S. Cl.
CPC .......... *C03B 37/01453* (2013.01); *C03C 3/06* (2013.01); *C03C 13/045* (2013.01); *G02B 6/02019* (2013.01); *G02B 6/0281* (2013.01); *G02B 6/0288* (2013.01); *G02B 6/03627* (2013.01); *G02B 6/03655* (2013.01); *G02B 6/03683* (2013.01); *C03B 2201/12* (2013.01); *C03B 2201/20* (2013.01); *C03B 2203/23* (2013.01); *C03C 2201/11* (2013.01); *C03C 2201/12* (2013.01)

(56) References Cited

U.S. PATENT DOCUMENTS

| | | | |
|---|---|---|---|
| 6,027,062 A | 2/2000 | Bacon et al. | |
| 6,134,367 A | 10/2000 | Jones et al. | |
| 7,088,900 B1 | 8/2006 | Mishra | |
| 7,315,677 B1 | 1/2008 | Li et al. | |
| 7,421,172 B2 | 9/2008 | Matthijse et al. | |
| 7,536,076 B2 | 5/2009 | Khrapko et al. | |
| 7,565,820 B2 | 7/2009 | Foster et al. | |
| 7,832,675 B2 | 11/2010 | Bumgarner et al. | |
| 8,588,568 B2 | 11/2013 | Bookbinder et al. | |
| 8,965,163 B2 | 2/2015 | Bookbinder et al. | |
| 9,020,316 B2 | 4/2015 | Bookbinder et al. | |
| 9,802,858 B2 * | 10/2017 | Bookbinder | C03C 3/06 |
| 2002/0073740 A1 | 6/2002 | Dawes et al. | |
| 2004/0240814 A1 | 12/2004 | Boek et al. | |
| 2005/0201699 A1 | 9/2005 | Ball et al. | |
| 2011/0044700 A1 | 2/2011 | Sasaoka et al. | |
| 2012/0198892 A1 | 8/2012 | Tamura et al. | |
| 2014/0241684 A1* | 8/2014 | Bookbinder | G02B 6/0281 385/124 |
| 2014/0352361 A1 | 12/2014 | Dawes et al. | |
| 2016/0299289 A1 | 10/2016 | Bookbinder et al. | |

OTHER PUBLICATIONS

Jeunhomme, L., "Single Mode Fiber Optics: Principles and Applications." 2nd Edition, Chapter 1, pp. 38-44, 1990.
Olshansky, R., "Mode coupling effects in graded-index optical fibers." Applied Optics, vol. 14, No. 4, pp. 935-945, Apr. 1975.
Olshansky, R., "Multiple-α index profile." Applied Optics, vol. 18, No. 5, pp. 683-689, Mar. 1, 1979.
Tandon, P. , "Doping of silica during sintering." Journal of Non-Crystalline Solids, vol. 351, pp. 1466-1472, Apr. 29, 2005.

* cited by examiner

LOW LOSS OPTICAL FIBERS WITH FLUORINE AND CHLORINE CODOPED CORE REGIONS

This application is a continuation of U.S. patent application Ser. No. 15/096,821 filed Apr. 12, 2016, which claims the benefit of priority to U.S. Provisional Application Ser. No. 62/147,777 filed on Apr. 15, 2015, both applications being incorporated herein by reference in their entirety.

BACKGROUND

The disclosure generally relates to low cost, low attenuation optical fibers for data transmission and, more particularly, relates to fiber designs with co-doped core regions.

Low attenuation (e.g., a fiber having an attenuation value of ≤0.17 dB/km) is an important characteristic of optical fibers configured to efficiently transmit data.

Fiber nonlinearity is also a factor limiting the performance of optical fibers used in high speed, long haul transmission applications. In general, fiber nonlinearity can be reduced by increasing the effective area of the fiber. This is because power density is inversely proportional to the effective area. While some fiber designs configured for single mode operation have focused on increasing the effective area, the effective area achieved by these designs has been limited by micro- and macro-bending losses. With recent advances in digital signal processing (DSP), linear impairment to transmission systems (e.g., chromatic dispersion and polarization mode dispersion (PMD)), is not a significant problem. Yet even with the advancements in DSP, the modal dispersion levels still should be minimized.

Multiple mechanisms can contribute to the attenuation and loss characteristics in optical fibers. These mechanisms can include Rayleigh scattering, small-angle scattering, metals and impurity-related absorption effects, and other UV and IR-related effects. Density and concentration fluctuations in the fibers can contribute to Rayleigh scattering. It is generally understood that the composition of the fiber regions (e.g., core and cladding), and their respective processing conditions, may influence these mechanisms.

SUMMARY

One aspect of the present disclosure relates to a single mode optical fiber having an attenuation of less than about 0.17 dB/km at a wavelength of 1550 nm. The fiber includes a core region in the fiber having a graded refractive index profile with an alpha of greater than about 5. The fiber also includes a first cladding region in the fiber that surrounds the core region. Further, the core region has a relative refractive index of about −0.10% to about +0.05% compared to pure silica. In addition, the core region includes silica that is co-doped with chlorine at about 1.2% or greater by weight and fluorine between about 0.1% and about 1% by weight.

Another aspect of the present disclosure relates to a single mode optical fiber including a fiber having an attenuation of less than about 0.17 dB/km at a wavelength of 1550 nm. The fiber includes a core region in the fiber that comprises silica co-doped with fluorine and chlorine; and a first cladding region in the fiber that surrounds the core region. Further, the core region has a graded refractive index profile having an alpha greater than 5. In addition, the first cladding includes a depressed region having a relative refractive index that is lower than a relative refractive index of the core region.

In certain aspects, the co-doped core region of these fibers can possess a graded refractive index profile with an alpha greater than about 5 and less than about 12. The co-doped core region, in certain cases, can possess a step-like or stepped refractive index profile with an alpha greater than about 12.

In certain implementations of the foregoing optical fibers, the first cladding region includes a depressed region having a relative refractive index that is lower than a relative refractive index of the core region. For example, the relative refractive index of the depressed region can be about 0.35%Δ less than the relative refractive index of the core region. According to an aspect, the relative refractive index difference between the core and the first cladding region is between 0.2%Δ and 0.5%Δ.

In another aspect, the optical fiber may include a fiber configured for few-mode operation. Such a fiber includes a core region in the fiber that comprises silica co-doped with fluorine and chlorine. The few-moded fiber also includes a core region that has a relative refractive index of about −0.10% to about +0.05% compared to pure silica, has a radius of about 6.0 microns and about 50 microns, and is configured to transmit optical data in greater than 2 and less than 8 modes at a wavelength of 1550 nm. The fiber further includes a first cladding region in the fiber that surrounds the core region. The first cladding region includes a depressed region having a relative refractive index that is substantially constant and lower than a relative refractive index of the core region. In addition, the fiber has an attenuation of less than about 0.17 kB/km at a wavelength of 1550 nm.

In further aspects of the disclosure, the optical fibers having a co-doped core region can exhibit an attenuation of less than about 0.16 dB/km, and certain of these fibers also possess attenuation levels as low as less than about 0.15 dB/km, as measured at a wavelength of 1550 nm. These co-doped fibers also may possess a fictive temperature of about 1400° C. or less, about 1300° C. or less, about 1200° C. or less, in some cases.

In certain aspects of the disclosure, the co-doped optical fibers have silica core regions that are co-doped with fluorine and chlorine such that the sum of the fluorine and chlorine in weight percent divided by the fluorine in weight percent is greater than a factor of about 1.5. In certain co-doped fiber configurations, the core region in the fiber includes silica co-doped with chlorine at about 1.2% or greater by weight and fluorine between about 0.1% and about 1% by weight. In other co-doped fiber configurations, the core region in the fiber includes silica co-doped with fluorine and chlorine, the chlorine at about 1.2% or greater, 1.5% or greater, 2% or greater, 2.5% or greater, or 3% or greater by weight and the fluorine at about 0.1% or greater, 0.2% or greater, 0.4% or greater, 0.6% or greater, 0.8% or greater, up to about 1% by weight.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
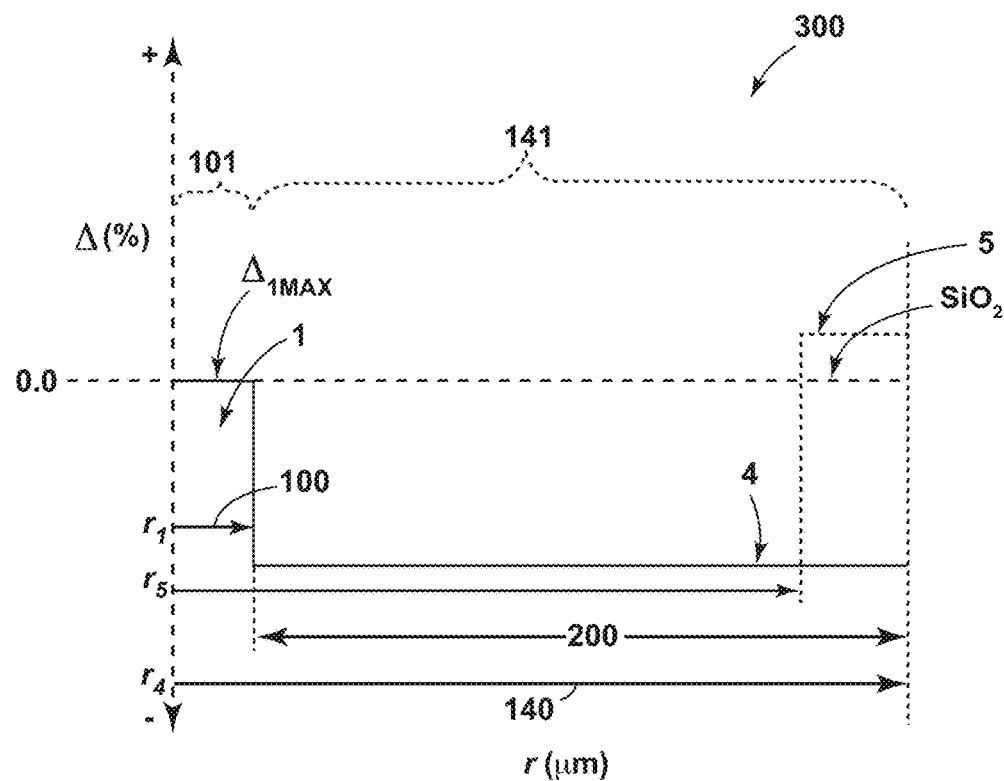
FIG. 1 is a schematic diagram that depicts refractive index as a function of fiber radius for an optical fiber with a co-doped core region and a cladding.

Reference will now be made in detail to the present preferred embodiments, examples of which are illustrated in the accompanying drawings. Whenever possible, the same reference numerals will be used throughout the drawings to refer to the same or like parts.

The "refractive index profile" is the relationship between refractive index or relative refractive index and fiber radius.

The terms "μm" and "micron" are used interchangeably herein.

The "relative refractive index percent" is defined in Equation (1) below as:

$$\Delta\% = 100 \times (n_i^2 - n_c^2)/2n_i^2 \quad (1)$$

where $n_c$ is the refractive index of undoped silica and $n_i$ is the average refractive index at point i in the particular region of the optical fiber.

As further used herein, the relative refractive index is represented by $\Delta$ and its values are given in units of "%", unless otherwise specified. The terms $\Delta$, % $\Delta$, $\Delta\%$, delta index, percent index, percent delta index and % can be used interchangeably herein. In cases where the refractive index of a region is less than the refractive index of undoped silica, the relative index percent is negative and is referred to as having a depressed region or depressed index. In cases where the refractive index is greater than the refractive index of undoped silica, the relative index percent is positive. An "up-dopant" is herein considered to be a dopant which has a propensity to raise the refractive index relative to pure undoped silica. A "down-dopant" is herein considered to be a dopant which has a propensity to lower the refractive index relative to pure undoped silica. Examples of up-dopants include $GeO_2$, $Al_2O_3$, $P_2O_5$, $TiO_2$, Cl, and Br. Examples of down-dopants include F and B.

"Chromatic dispersion," herein referred to as "dispersion" unless otherwise noted, of an optical fiber is the sum of the material dispersion and the waveguide dispersion. Zero dispersion wavelength is a wavelength at which the dispersion has a value of zero. Dispersion slope is the rate of change of dispersion with respect to wavelength.

"Effective area" is defined in Equation (2) as follows:

$$Aeff = 2\pi \left[ \frac{\left(\int f^2 r\,dr\right)^2}{\int f^4 r\,dr} \right] \quad (2)$$

where the integration limits are 0 to $\infty$, f is the transverse component of the electric field associated with light propagated in the waveguide (i.e., optical fiber), and r is the radius of the fiber. As used herein, "effective area" or "$A_{eff}$" refers to optical effective area at a wavelength of 1550 nm (i.e., the fundamental mode) unless otherwise noted.

The term "alpha" or "α-profile" refers to a relative refractive index profile, expressed in terms of $\Delta(r)$. $\Delta(r)$ is in units of "%," where r is radius, and follows Equation (3) as follows:

$$\Delta(r) = \Delta_{1max}\left[1 - \left(\frac{r}{r_1}\right)^\alpha\right] \quad (3)$$

where $\Delta_{1max}$ is the peak refractive index change in the center of the fiber (i.e., core delta), and $r_1$ is the core radius. Alpha as reported herein is measured at 1550 nm. An α=1 corresponds to a triangular relative refractive index profile, an α=2 describes a parabolic profile, and α>12 corresponds to a profile approaching a step index (i.e., a "step-like index profile" as used herein) profile. Accordingly, α=∞ corresponds to a pure step-index profile.

The mode field diameter (MFD) is measured using the Peterman II method as understood in the field of this disclosure according to Equation (4) as follows:

$$MFD = 2w; \text{ and} \quad (4)$$

$$w^2 = 2\frac{\int f^2 r\,dr}{\int \left(\frac{df}{dr}\right)^2 r\,dr}$$

where w is the mode field radius, and the integral limits are 0 to $\infty$. Unless otherwise noted, MFD at 1310 nm is from about 8.2 μm to about 9.5 μm and about 9.0 μm to about 12 μm for G.652 and G.654 co-doped optical fiber configurations according to the disclosure, respectively. MFD at 1550 nm is from about 9.0 μm to about 11 μm and about 9.0 μm to about 14 μm for G.652 and G.654 co-doped optical fiber configurations according to the disclosure, respectively.

The "theoretical fiber cutoff wavelength," "theoretical fiber cutoff," or "theoretical cutoff," for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength," also known as the "2 m fiber cutoff" or "measured cutoff." The FOTP-80 standard test is performed to either strip out the higher order modes using a controlled amount of bending, or to normalize the spectral response of the fiber to that of a multi-mode fiber.

A "cable cutoff measurement," as used herein, is performed using the standard 22 m test described in EIA-455-170 Cable Cutoff Wavelength of Single-mode Fiber by Transmitted Power, or "FOTP-170."

Unless otherwise noted herein, optical properties (such as dispersion, attenuation, etc.) are reported for the $LP_{01}$ mode.

The "effective group refractive index," also known as the "group index" ($n_{geff}$), is the ratio of the velocity of light, c, to the group velocity, $v_g$, as given below by Equation (5):

$$n_{geff} = \frac{c}{v_g} \quad (5)$$

The mathematical expression for $v_g$ of a guided mode in the fiber in terms of electromagnetic field, refractive index, wavelength and propagation constant, derives from Maxwell's equations, or, more particularly, from the scalar wave equation. The group velocity $v_g$ is defined below in Equation (6):

$$v_g = \frac{\partial \omega}{\partial \beta} \quad (6)$$

where ω is the wave's angular frequency, and β is the propagation constant of a guided mode. The propagation constant β, also called the effective refractive index, is an electromagnetic field parameter related to field propagation velocity and is found by solving the scalar wave equation for a selected waveguide. Because β depends upon waveguide geometry, one may expect that bending the waveguide will change β. See, e.g., U.S. Pat. No. 6,134,367 at 3:14-29, hereby incorporated by reference within this disclosure.

Doping of an optical fiber core region (e.g., a core region containing a silica-based glass composition) generally decreases the fictive temperature of the glass as suitable dopants introduced into the core region on an individual basis tend to reduce the viscosity of the glass. Many of the dopants that reduce the fictive temperature of the glass also tend to increase concentration fluctuations in the core region, contributing to increased Rayleigh scattering effects. Accordingly, only a few dopants can be used to lower the fictive temperature of the glass without significantly introducing concentration fluctuations such that a net lower attenuation can be obtained for the doped optical fiber.

The optical fiber designs outlined in this disclosure are configured with co-doped core regions that result in low loss optical fibers in view of the foregoing principles and considerations including, but not limited to, Rayleigh scattering effects. As used herein, "co-doping" refers to the introduction of two or more dopants into the core region of an optical fiber. Optical fiber configurations with co-doped core regions, and the methods to develop such co-doped core regions, result in appreciable reductions in the viscosity of the core region, Rayleigh scattering effects and, ultimately, fiber attenuation. The co-doping methods and fiber configurations herein also result in an effective index that is close to that of silica; consequently, typical doping levels can be employed in the cladding to effect wave-guide behavior consistent with the intended operation of the fiber (e.g., single mode, few mode and multi-mode).

Low attenuation levels can be obtained with the co-doped fibers according to aspects of the disclosure. In particular, attenuation levels at 1550 nm of less than about 0.18 dB/km and, in some embodiments, less than about 0.17 dB/km can be obtained by co-doping the core region of these fibers. Even lower attenuation levels of less than about 0.16 dB/km, and less than about 0.15 dB/km can be obtained according to some co-doped fiber embodiments. The co-doping of the core region with both fluorine and chlorine results in low viscosity levels in the core. These low viscosity levels contribute to a reduction in the fictive temperature and density fluctuations within the core region, thereby reducing Rayleigh scattering effects. Additionally, the addition of chlorine and fluorine dopants in the fiber results in a minimal increase in the concentration fluctuations within the core regions of these fibers, a further contribution to the low attenuation levels observed in these optical fibers. In addition, the inclusion of both fluorine and chlorine in the core region tends to result in a relative refractive index in the core region that is close to the refractive index of pure silica. As such, various desired wave-guide characteristics (e.g., single mode, few mode and multi-mode) can be readily achieved with these co-doped fiber configurations by control of the relative refractive index in the cladding through cladding composition and doping adjustments.

The co-doped optical fiber designs outlined in this disclosure can also be optimized for low attenuation performance in both single and few mode configurations by limiting the $GeO_2$ content in the fiber. Further, a germania-limited core in the optical fiber can improve the attenuation performance of the optical fiber by reducing the effects of Rayleigh scattering. By "$GeO_2$-limited $SiO_2$ core" as used herein, it is meant that the fibers contain less than about 1.0 wt. % of $GeO_2$ or $TiO_2$, alone or in combination. Preferably, the co-doped fibers disclosed herein contain less than about 0.5 wt. %, and more preferably less than about 0.1 wt. % of $GeO_2$ or $TiO_2$, alone or in combination. In certain co-doped optical fiber implementations, the concentrations of $GeO_2$ and/or $TiO_2$ can approach, or be set, to zero.

In some embodiments, the co-doped core region of the fibers includes fluorine- and chlorine-doped silica. The core region of the fibers disclosed herein may additionally include one or more of potassium oxide and phosphorous pentoxide. Such fibers which have low amounts of $GeO_2$ and $TiO_2$ in their respective core regions can exhibit even lower attenuation levels due to less Rayleigh scattering contributions.

It is preferred that the co-doped fibers of this disclosure have an outer diameter of between about 80 microns and about 150 microns. In some aspects, the co-doped fibers may have an outer diameter of between about 120 microns and about 130 microns. Certain preferred embodiments of the fibers have an outer diameter of about 125 microns.

More improvements in attenuation can be realized by optimizing the fluorine and chlorine dopant profile in a $GeO_2$-limited $SiO_2$ core. Preferably, the co-doped core region of these fibers can possess a moderately graded refractive index profile with an alpha greater than about 5, or even greater than about 10 in some cases, to improve attenuation performance. The co-doped core region, in certain cases, can possess a step-like or stepped refractive index profile with an alpha greater than about 12. In other aspects, a more graded index profile can be used in the core instead of a stepped index core. In particular, such a graded profile can exhibit an alpha value of about 0.5 to about 5, with fluorine and chlorine doped in a $GeO_2$-limited core to provide the graded index. Optionally, $K_2O$ and/or $P_2O_5$ dopants may be introduced in the stepped, step-like or graded core region for added optical performance benefits.

Various gradation levels in the refractive index profile of the co-doped core region can result in a reduced viscosity mismatch between the core and the cladding. Similarly, a moderately to highly graded index profile (e.g., an alpha from 0.5 to about 12) can also reduce the coefficient of thermal expansion-related (CTE) mismatch within the core and between the core and cladding. Together, these effects can reduce internal stresses in the core, leading to better attenuation characteristics.

The alpha profile in the co-doped core (i.e., the graded, step-like or stepped index profile) can be achieved using various methods. One approach relies on a non-uniform consolidation technique for doping with fluorine in a graded index. The non-uniform consolidation technique relies on outside vapor deposition (OVD) and vapor-phase axial deposition (VAD) methods. A second approach relies on a modified chemical vapor deposition (MCVD) approach. A third approach relies on a plasma-assisted chemical vapor deposition (PCVD) approach. In MCVD and PCVD approaches, the optical fiber core is made by layer-by-layer glass deposition, and the processes used to dope each layer can be independently controlled.

As the core region of the fibers in this disclosure contain both F and Cl dopants (e.g., fluorine, F, and chlorine, Cl), it can be advantageous for the concentrations of both the chlorine and fluorine to vary at roughly the same amount as a function of radial distance from the center of the core to the outer radius of the core. For example, both the fluorine and the chlorine can be highest at the center of the core region and slightly decrease as a function of radial distance to the outer radius of the core. It can also be advantageous for each dopant to be introduced into the core in a non-uniform, graded or step-like index profile. In particular, the chlorine concentration can be highest in the center of the core, lower at the outer radius of the core, with a doping profile approximately inverse to that of the graded or step-like profile achieved by the fluorine dopant. Thus, the concentration of the fluorine dopant at the center of the core may be relatively low, but increasing toward the outer radius of the core to form a graded or step-like index profile. These various co-doped graded or step-like profiles can be created during the sinter phase of the core or during drying phase of a soot-deposited core in a down-drive furnace, or with MCVD or PCVD processing techniques. $Cl_2$ or $SiCl_4$ can be used as the source precursor for chlorine dopants. $SiF_4$ can be used as the source precursor for fluorine dopants.

In certain aspects of the disclosure, the co-doped optical fibers have silica core regions that are co-doped with fluorine and chlorine with a "co-doping ratio" such that the sum of the fluorine and chlorine in weight percent divided by the fluorine in weight percent is greater than a factor of about 1.5. In a particular exemplary co-doped fiber configuration, the core region in the fiber includes silica co-doped with chlorine and fluorine at about 1.5% and at about 0.6% by weight, respectively. Such an embodiment has a co-doping ratio of about 3.5 (i.e., 3.5=about 1.5 wt. % Cl+about 0.6 wt. % F)/about 0.6 wt. % F). In some co-doped fiber aspects, the core region is co-doped with chlorine at about 1.2% or greater by weight and fluorine between about 0.1% and about 1% by weight. In other co-doped fiber configurations, the core region in the fiber includes silica co-doped with fluorine and chlorine, the chlorine concentration in the core region at about 1.2% or greater, about 1.3% or greater, about 1.4% or greater, about 1.5% or greater, about 2% or greater, 2.5% or greater, or 3% or greater by weight, and the fluorine at about 0.1% or greater, about 0.2% or greater, 0.4% or greater, 0.6% or greater, 0.8% or greater, up to about 1% by weight. As such, the co-doped optical fibers may employ higher chlorine dopant concentrations in the core region than the respective concentration levels of fluorine in the core region. In some embodiments, the core region comprises silica co-doped with chlorine at about 1.5% or greater by weight and about 0.1% by weight≤fluorine≤about 0.6% by weight.

The composition of the cladding can also be important in achieving the desired low attenuation properties, and may be doped with fluorine to lower the refractive index to be lower than the refractive index of the core region. In certain aspects of the co-doped fibers, the relative refractive index of a depressed region within the cladding (e.g., achieved through doping) can be about 0.35%Δ or lower than the relative refractive index of the core region. Similarly, the relative refractive index difference between the core and the first cladding region of the cladding can be between 0.2%Δ and 0.5%Δ in some embodiments. Optionally, the cladding may be further doped with one or more of boron trioxide and chlorine.

A step index between the core and cladding is acceptable for the co-doped optical fibers according to the disclosure. Optionally, chlorine and/or $B_2O_3$ can be employed as dopants in the cladding alone, or as additions to a fluorine dopant already present in the cladding.

In some embodiments of the optical fiber designs in this disclosure, the core and cladding can be configured to minimize or eliminate the presence of alkali elements (e.g., potassium). Comparatively, alkali doping is more expensive than doping processes used for other dopants (e.g., fluorine doping). Accordingly, the co-doped, alkali-free optical fiber designs disclosed herein are particularly optimized to reduce processing and manufacturing costs.

Figure 1A:
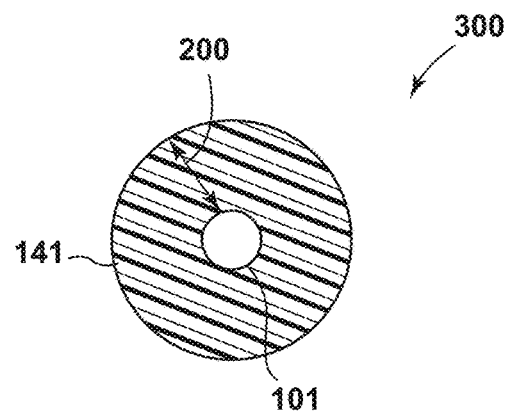
FIG. 1A is a cross-sectional view of the optical fiber depicted in FIG. 1.
Figure 2:
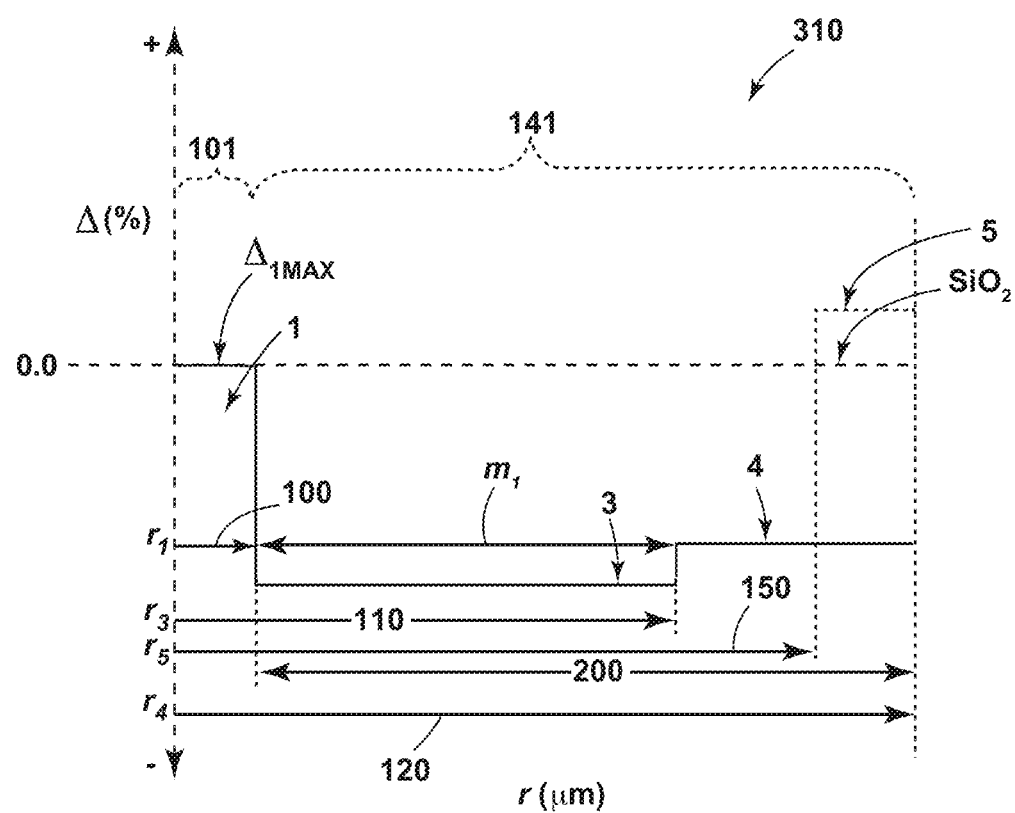
FIG. 2 is a schematic diagram that depicts refractive index as a function of fiber radius for an optical fiber with a co-doped core region, a first cladding layer and a second cladding layer.
Figure 3:
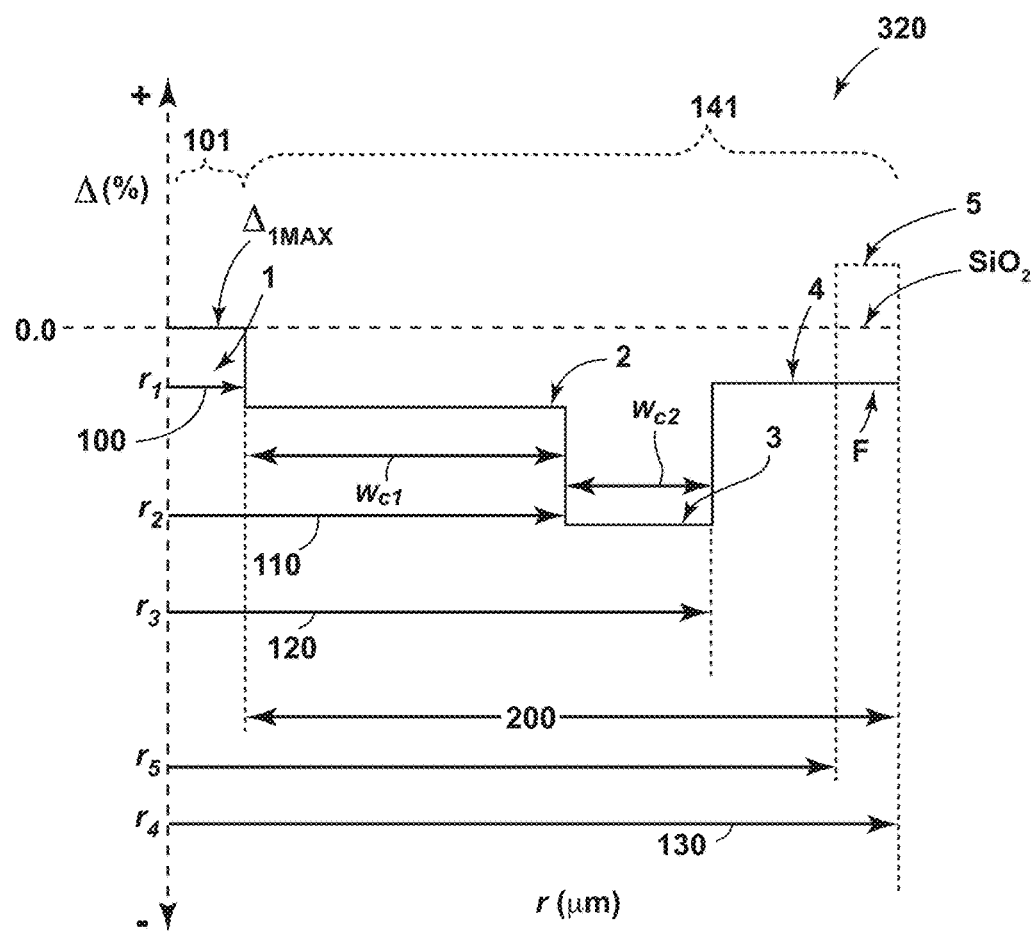
FIG. 3 is a schematic diagram that depicts refractive index as a function of fiber radius for an optical fiber with a co-doped core, a first cladding layer, a second cladding layer, and a third cladding layer.

FIGS. 1-3 depict the relative refractive index profile as a function of fiber radius for three co-doped optical fiber designs 300, 310 and 320, respectively, according to aspects of this disclosure. These relative refractive index profiles of fibers 300, 310 and 320 are plotted using pure undoped $SiO_2$ as a baseline relative refractive index equal to zero. Each of these optical fiber designs 300, 310, and 320 may be configured for single mode and few mode (i.e., plurality of modes) operational schemes at 1550 nm according to aspects of this disclosure. A cross-section of fiber 300 is also shown in FIG. 1A, for further illustration of the salient features of these fibers.

As shown in FIGS. 1-3, each co-doped fiber 300, 310, and 320 possesses a core 101. The core 101 can have an alpha profile from about 0.5 to about 5, greater than about 10, and greater than about 20, in some aspects, to form a graded or step-like, relative refractive index profile 1. Preferably, core 101 exhibits an alpha profile from about 10 to about 20. The relative refractive index 1 ($\Delta_1$) of the core 101 varies as a function of fiber radius (r). The core 101 has a core radius 100 ($r_1$). The core 101, from its center to its radius 100 ($r_1$), primarily contains $SiO_2$ doped with F and Cl. Optionally, the core 101 may be doped with $K_2O$, and/or $P_2O_5$. These dopants may be introduced into the $SiO_2$ core 101 by OVD, VAD, MCVD, and PCVD processing methods.

Co-doped fibers 300, 310 and 320 have a single cladding 141 (FIGS. 1 and 1A), a cladding with two cladding layers (FIG. 2) or a cladding with three cladding layers (FIG. 3). All of the cladding layers may primarily contain $SiO_2$ doped with F. Optionally, Cl and/or $B_2O_3$ can be employed as dopants in the various cladding layers in addition to the F dopant.

Referring to FIGS. 1 and 1A, co-doped optical fiber 300 possesses a cladding 141 with a thickness 200 and outer radius 140 ($r_4$). The relative refractive index 4 ($\Delta_4$) of the cladding 141 is preferably substantially constant out to the outer radius 140 ($r_4$). The relative refractive index 4 of the cladding 141 may be a step-shaped profile and comprises $\Delta_{2min}$.

Referring to FIG. 2, co-doped optical fiber 310 possesses a cladding 141 having two cladding layers, comprising a depressed cladding layer relative refractive index profile 3 and outer cladding layer relative refractive index profile 4. Each of these cladding layers surround the core region 101. As depicted in FIG. 2, the depressed cladding layer has a relative refractive index profile 3 with a lower refractive index delta than the relative refractive index profile 4 of the outer cladding layer. Together, these two cladding layers possess a total thickness 200, corresponding to the thickness of the cladding 141. The relative refractive index profiles 3 and 4 in cladding layer 141 each may possess a step-shaped profile.

As also shown in FIG. 2, the relative refractive index profile of the depressed cladding layer 3 in co-doped fiber 310 may have a value approximately equal to $\Delta_{3min}$. In FIG. 2, the relative refractive index profile 3 of the depressed cladding layer exhibits a moat of width $m_1$ such that its relative refractive index ($\Delta_3$) is lower than the relative refractive index of the core region 101 and the relative refractive index ($\Delta_4$) of the outer cladding layer, which corresponds to the relative refractive index profile 4. As shown in FIG. 2, the depressed cladding layer with a relative refractive index profile 3 extends to a radius 110 ($r_3$). F, Cl and/or $B_2O_3$, or combinations thereof, may be included as refractive index-lowering dopants in the depressed cladding layer to facilitate the creation of the moat of width $m_1$ with respect to outer cladding layer, corresponding to the relative refractive index profile 4. The relative refractive index 4 ($\Delta_4$) of the outer cladding is preferably substantially constant out to its outer radius ($r_4$) 120.

Referring to FIG. 3, co-doped optical fiber 320 possesses a cladding 141 having three cladding layers, corresponding to an inner cladding layer relative refractive index profile 2, depressed cladding layer relative refractive index profile 3, and the outer cladding layer relative refractive index profile 4, all surrounding the core region 101 with its corresponding relative refractive index profile 1. Together, the cladding layers that correspond to the relative refractive index profiles 2, 3 and 4 possess a total thickness 200. Further, the inner cladding region extends to radius $r_2$ (110), the depressed cladding layer extends between radius $r_2$ (110) and radius $r_3$ (120), and the outer cladding layer extends between radius $r_3$ (120) and outer radius $r_4$ (130).

Referring again to FIG. 3, the depressed cladding layer with its relative refractive index profile 3 exhibits a relative refractive index $\Delta_{3min}$. The outer cladding layer with its relative refractive index profile 4 exhibits a relative refractive index $\Delta_4$, which can be substantially constant out to the outer radius $r_4$ (130).

The relative refractive index profiles 2, 3, 4 of the cladding layers making up cladding 141, respectively, may each possess a step-shaped profile. As shown in FIG. 3, the relative refractive index profile 2 of the inner cladding layer may comprise a relatively constant refractive index, while the relative refractive index profile 3 of the depressed cladding layer may comprise a trench of width $w_{c2}$ having relative refractive index $\Delta_3$ which is lower than the relative refractive index $\Delta_1$ of the core region 101, lower than $\Delta_2$ of the inner cladding layer (i.e., corresponding to relative refractive index profile 2), and lower than the relative refractive index $\Delta_4$ of outer cladding layer (i.e., corresponding to relative refractive index profile 4). The relative refractive index profile 3 of the depressed cladding layer may be offset from the core region 101 and its relative refractive index profile 1 by a distance $w_{c1}$, which corresponds to the width of the inner cladding region that corresponds to relative refractive index profile 2. F, Cl and/or $B_2O_3$, and combinations thereof may be added as refractive index lowering dopants to any of the cladding layers making up the cladding 141 (i.e., corresponding to relative refractive index profiles 2, 3, and 4, respectively) to facilitate the creation of these cladding regions.

When configured for single mode operation, co-doped optical fibers 300, 310 and 320 (see FIGS. 1-3) can have an alpha between about 10 and about 20. In certain aspects, the relative refractive index profile 1 of the core region 101 can exhibit a step-like shape with alpha of about 20 or greater. In some additional aspects, the co-doped optical fibers 300, 310 and 320 can possess an alpha of about 0.5 to about 5. The alpha value may also be set within a range of about 1 to about 3. Further, the core 101 of fibers 300, 310 and 320 may have a peak relative refractive index $\Delta_{1max}$ of about −0.2% to about +0.1%. The peak relative refractive index $\Delta_{1max}$ may also range from about −0.05% to about +0.05%. In addition, the core 101 of fibers 300, 310, and 320, when configured for single mode operation, can have a core radius 100 ($r_1$) of about 4 to 12 microns. The effective area, $A_{eff}$, of core 101 can range from about 60 μm² to about 100 μm².

The co-doped optical fibers 300, 310 and 320 configured for single mode operation include relatively low cost fluorine and chlorine dopants compared to other dopant options, including germania. Yet these co-doped optical fiber designs possess un-characteristically low attenuation, less than about 0.17 dB/km at a wavelength 1550 nm. In certain aspects, the co-doped optical fibers can exhibit very low attenuation levels of less than about 0.16 dB/km, and even less than about 0.15 dB/km. Fibers 300, 310, and 320, when configured for single mode operation at 1550 nm, are particularly suited for G.652 and G.654 optical fiber applications. Such co-doped fibers 300, 310 and 320 configured for single mode operation may, for example, exhibit a cable cutoff less than 1530 nm, more preferably less than 1500 nm, and even more preferably less than 1260 nm, and a zero dispersion wavelength between 1300 and 1324 nm. For G.654 applications the fibers may be configured to have dispersion at 1550 nm which is less than or equal to about 22 ps/nm/km.

When configured for operation in a few mode propagation (i.e., capable of transmitting a plurality of modes at about 1400 to about 1700 nm, more preferably about 1500 to about 1625 nm, most preferably about 1530 to about 1570 nm), co-doped optical fibers 300, 310 and 320 (see FIGS. 1-3) can have an alpha of about 10 or greater, about 20 or greater, and preferably between about 10 and 20. In other aspects, the co-doped optical fibers 300, 310 and 320 can be configured for operation in few moded propagation with an alpha that ranges from about 0.5 to about 5. "Few moded propagation" and "capable of transmitting few modes" as used herein is defined as transmitting greater than 2 and less than 8 modes at a particular wavelength. Such fibers disclosed herein may transmit between 2 and 6, more preferably between 2 and 4 modes.

In addition, the core 101 of few-moded, co-doped fibers 300, 310 and 320 may have a peak relative refractive index $\Delta_{1max}$ of about −0.2% to about +0.1% when using pure $SiO_2$ as the baseline. The peak relative refractive index $\Delta_{1max}$ may also range from about −0.05% to about +0.05%. In addition, the core 101 (i.e., core region) of co-doped fibers 300, 310, and 320 when configured for few mode operation can have a core radius 100 ($r_1$) of about 5 microns to about 50 microns. The effective area, $A_{eff}$, of core 101 can range from about 90 μm² to at least about 525 μm².

The co-doped optical fibers 300, 310 and 320 configured for few mode operation include relatively low cost of fluorine and chlorine dopants compared to other dopant options, including germania. Yet these optical fiber designs possess low attenuation, less than about 0.17 dB/km at a wavelength 1550 nm. In some aspects, these few moded, co-doped optical fibers have very low attenuation levels of less than about 0.16 dB/km, or even as low as less than about 0.15 dB/km at 1550 nm. Few mode-configured fibers 300, 310 and 320 are suited for G.652 and G.654 optical fiber applications. They are also well-suited for low attenuation applications requiring a large fiber effective area, and multi-mode operation, particularly those requiring high data rate transfer over long distances.

Low-attenuation co-doped optical fibers 300, 310 and 320 that are doped with fluorine and chlorine may still be prone to "stress-optic" effects. In particular, these fibers can be prone to high internal stresses associated with their production that can degrade optical performance, despite the use of a stepped, step-like or moderately graded index core. In particular, the internal stresses generated during the production of these fibers can influence their refractive index profiles in a way that compromises their optical transmission properties.

Figure 4:
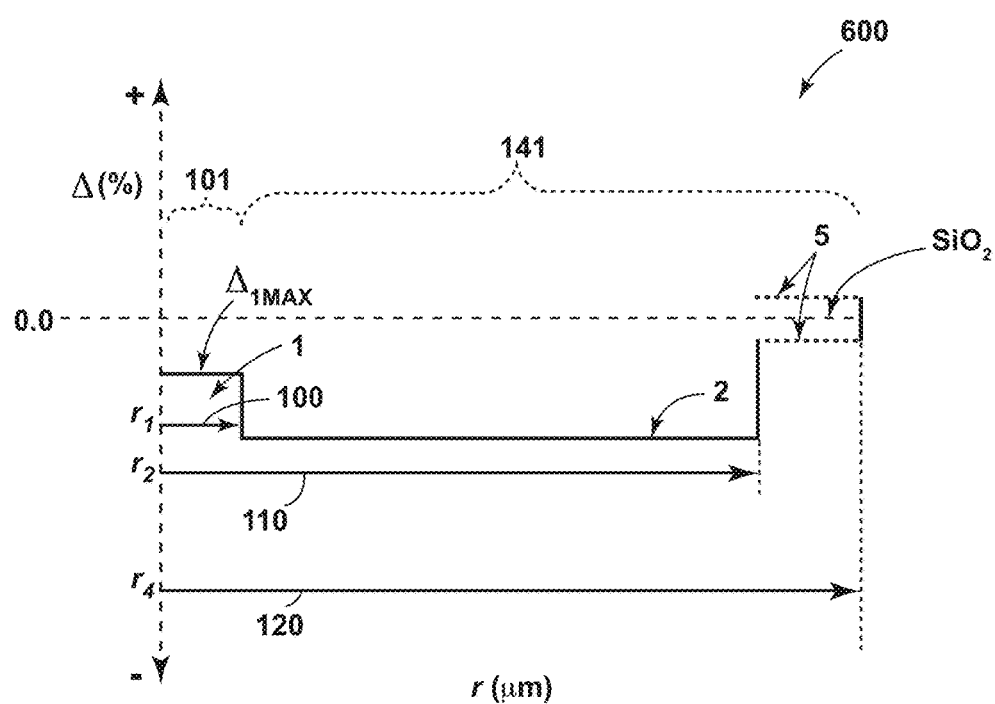
FIG. 4 is a schematic diagram that depicts refractive index as a function of fiber radius for an optical fiber with a co-doped core, an inner cladding and an outer cladding.

A modified version of the co-doped optical fibers 300, 310 and 320 (see FIGS. 1-3) is exemplified by a co-doped optical fiber 600, depicted in FIG. 4. Fiber 600 is configured to minimize "stress-optic" effects and to operate at a single mode or a plurality of modes. As shown, fiber 600 possesses a core 101 with a radius 100 ($r_1$). As depicted in FIG. 4, the core 101 has a relative refractive index profile with an alpha profile having an alpha of about 12 or greater, about 20 or greater, and preferably between about 12 and 20. In certain aspects, the alpha profile of the core 101 is indicative of a more highly graded profile with an alpha of about 0.5 to about 5. In other aspects, the relative refractive index 1 ($\Delta_1$) of the core 101 varies as a function of fiber radius (r). The relative refractive index profile 1 reaches its peak refractive index change (i.e., core delta or $\Delta_{1max}$) at the core radius 100. Note that the relative refractive index profiles of fiber 600 are plotted in FIG. 4 using pure $SiO_2$ as a baseline relative refractive index equal to zero.

Further, the core 101 of the co-doped fiber 600 depicted in FIG. 4, from its center to its outer radius 100 ($r_1$), primarily contains $SiO_2$ that is co-doped with fluorine and chlorine. Preferably, the core 101 comprises $GeO_2$-limited $SiO_2$ doped with fluorine and chlorine. Optionally, the core 101 may also be doped with $K_2O$, and/or $P_2O_5$. These dopants may be introduced into the core 101 by OVD, VAD, MCVD, and PCVD processing methods, as described in the foregoing.

As further depicted in FIG. 4, co-doped fiber 600 has an inner cladding with a relative refractive index profile 2 and a radius 110 ($r_2$). The thickness of the inner cladding corresponding to the relative refractive index profile 2 is the difference between its radius 110 and the radius 100 of the core 101. The inner cladding preferably primarily contains $SiO_2$ doped with F to form a step-shaped refractive index profile 2 ($\Delta_2$). In some aspects of the co-doped fiber 600, the fluorine concentration of the inner cladding, $F_{inner\ cladding}$, exceeds the fluorine concentration in the core region 101. Further, the relative refractive index ($\Delta_2$) of the relative refractive index profile 2 of the inner cladding is less than the maximum relative refractive index ($\Delta_{1MAX}$) of the core region 101. In certain aspects, and as depicted in FIG. 4, the relative refractive index profile 2 of the inner cladding is also less than or equal to the minimum relative refractive index of the relative refractive index profile 1 of the core region 101. Optionally, Cl and/or $B_2O_3$ can be employed as dopants in the inner cladding corresponding to the relative refractive index profile 2.

Co-doped fiber 600, as depicted in FIG. 4, also includes an outer cladding with an outer radius 120 ($r_4$). Together, the inner cladding and outer cladding make up cladding 141 and correspond to the relative refractive index profiles 2 and 5, respectively. The thickness of the outer cladding corresponding to the relative refractive index profile 5 is the difference between its outer radius 120 ($r_4$) and the outer radius of the inner cladding 110 ($r_3$). The outer cladding corresponding to the relative refractive index profile 5 primarily contains $SiO_2$ having a fluorine concentration, $F_{outer\ cladding}$, that is equal to or less than the minimum amount of fluorine in the core region 101. The outer cladding has a relative refractive index $\Delta_5$, and an outer radius $r_4$ (120). The relative refractive index 5 ($\Delta_5$) of the outer cladding is typically greater than the relative refractive indices $\Delta_1$ and $\Delta_2$ of the core 101 and the inner cladding (i.e., the region corresponding to the relative refractive index profile 2), respectively. In some aspects of the fiber 600, the relative refractive index 5 of the outer cladding portion of the cladding 141 may exceed 0% and the refractive index of pure silica (see FIG. 4). Further, the outer cladding may comprise silica doped with fluorine at a concentration approximately equal to or less than the minimum concentration of the fluorine in the core region 101. In some embodiments, the absolute value $|\Delta_{1max}-\Delta_5|$ may be between about 0.0 and about 0.5, in other embodiments, $|\Delta_{1max}-\Delta_5|$ may be between about 0.0 and about 0.2.

In certain aspects of the disclosure, the outer cladding of the co-doped fiber 600 depicted in FIG. 4 is stiff in the sense that its viscosity is greater than the viscosity of the core 101 and the inner cladding (i.e., the region corresponding to the relative refractive index profile 2) at fiber processing temperatures. It is also preferable to fabricate the outer cladding to be substantially free of chlorine. The presence of chlorine in the outer cladding can be limited by introducing carbon monoxide during the processes used to consolidate the outer cladding.

The co-doped optical fiber 600 (see FIG. 4) may be fabricated with drawing processes having a draw tension of about less than 90 g. Preferably, the draw tension is set at less than about 45 g, and more preferably, set between about 30 g and about 45 g. Fiber 600, formed with these processing parameters, is even less susceptible to draw-induced stresses that can be detrimental to the optical transmission properties of the fiber, including waveguide propagation performance. Co-doped optical fibers 600, when processed and configured according to the foregoing, are estimated to possess an attenuation of less than about 0.17 dB/km, less than about 0.16 dB/km, and even less than about 0.15 dB/km, at operating wavelengths of 1550 nm.

A co-doped optical fiber without a stiff outer cladding portion may have draw-induced stresses that can negatively affect its refractive index profile. Accordingly, the relatively high internal tensile stress in the core region of such a fiber could lead to a reduced refractive index differential between the core and the inner cladding of the fiber. In turn, these effects can result in decreased waveguide propagation performance. In contrast, a stiff outer cladding (e.g., as corresponding to the relative refractive index profile 5 of the co-doped fiber 600 depicted in FIG. 4) can be employed in such a fiber, as described in the foregoing. For example, when an outer cladding having a radius 120 ($r_4$) is present in the fiber 600, the fiber can exhibit improved stress levels and optical characteristics. The maximum axial stress level in the core 101 will drop (e.g., from about 200 MPa to about 250 MPa to about 100 MPa or less) as a result of the presence of the stiff outer cladding. Further, the difference between the maximum core index $\Delta_{1max}$ and the inner cladding index $\Delta_2$ can increase to levels of about 0.3%Δ or greater.

The co-doped optical fiber 600 depicted in FIG. 4 can also be processed at a lower draw tension to further improve its optical transmission performance properties. As a result of the lower draw tension, the maximum axial tensile stress level in the core 101 can drop to levels below about 50 MPa in tension. Further, the difference between the maximum core index $\Delta_{1max}$ and the inner cladding index $\Delta_2$ can increase to about 0.35%Δ or greater.

The outer cladding (i.e., as corresponding to the relative refractive index profile 5) of the co-doped fiber 600 depicted in FIG. 4 may also be configured to comprise $SiO_2$ doped with a small percentage by weight of nitrogen (N) to convert some $SiO_2$ to silicon oxynitride ($SiO_xN_y$) where 1<x<2 and 0<y<1. In particular, the outer cladding may be doped with greater than about 0.1% by weight N. In some embodiments, the outer cladding includes greater than about 0.1% to about 1.0% by weight of nitrogen. Doping the outer cladding with nitrogen can further increase its stiffness. As a result, the use of $SiO_xN_y$ in the outer cladding can reduce the axial tensile stress levels (in MPa) in the co-doped fiber 600 and increase the relative refractive index (%) vs. fiber radius (μm), respectively, for the fiber.

Similar to those embodiments of the fiber 600 (see FIG. 4) that contain a stiff outer cladding portion, certain aspects of the disclosure also relate to fibers 300, 310 and 320 (see FIGS. 1-3) with a stiff outer cladding portion of the cladding 141 (i.e., a stress relieving layer). In particular, the stress relieving layer of these aspects of fibers 300, 310 and 320 may be an outer portion of the cladding 141 that extends between radius 150 ($r_5$) and the respective radii 140, 120 or 130 ($r_4$), and corresponds to the relative refractive index 5 (see FIGS. 1-3). This outer cladding portion is configured in view of the composition and dimensions of the core region 101, along with other portions of the cladding 141 associated with relative refractive index profiles 2 and 3 (e.g., a moat of width $m_1$ or a trench of width $w_{c2}$), if present (see FIGS. 2 and 3). This stress relieving layer is a stiff outer cladding layer as compared to these other regions (e.g., core region 101 and other portions of the cladding 141). As such, the stress relieving layer within the cladding 141 relieves stress from the light-carrying portions of the optical fiber and thus lowers optical fiber attenuation.

In certain embodiments of the fibers 300, 310 and 320, the stiff outer cladding portion (i.e., a stress relieving layer) in the cladding 141 (i.e., between $r_3$ and $r_4$) has a pure silica glass composition. In other aspects, the stiff outer cladding portion has a silicon oxynitride glass composition. According to certain implementations, the stiff outer cladding portion of the cladding 141 has a composition with F (e.g., less moles of F) than the combined total amount of Cl and F (e.g., less total moles of Cl and F) within the composition of the core region 101. The stiff outer cladding portion of the cladding 141 can also have less moles of Cl and F than the combined total moles of Cl and F in the core region 101. In an additional embodiment, the stiff outer cladding portion has less moles of Cl than the combined total moles of Cl and F in the core region 101.

Figure 2A:
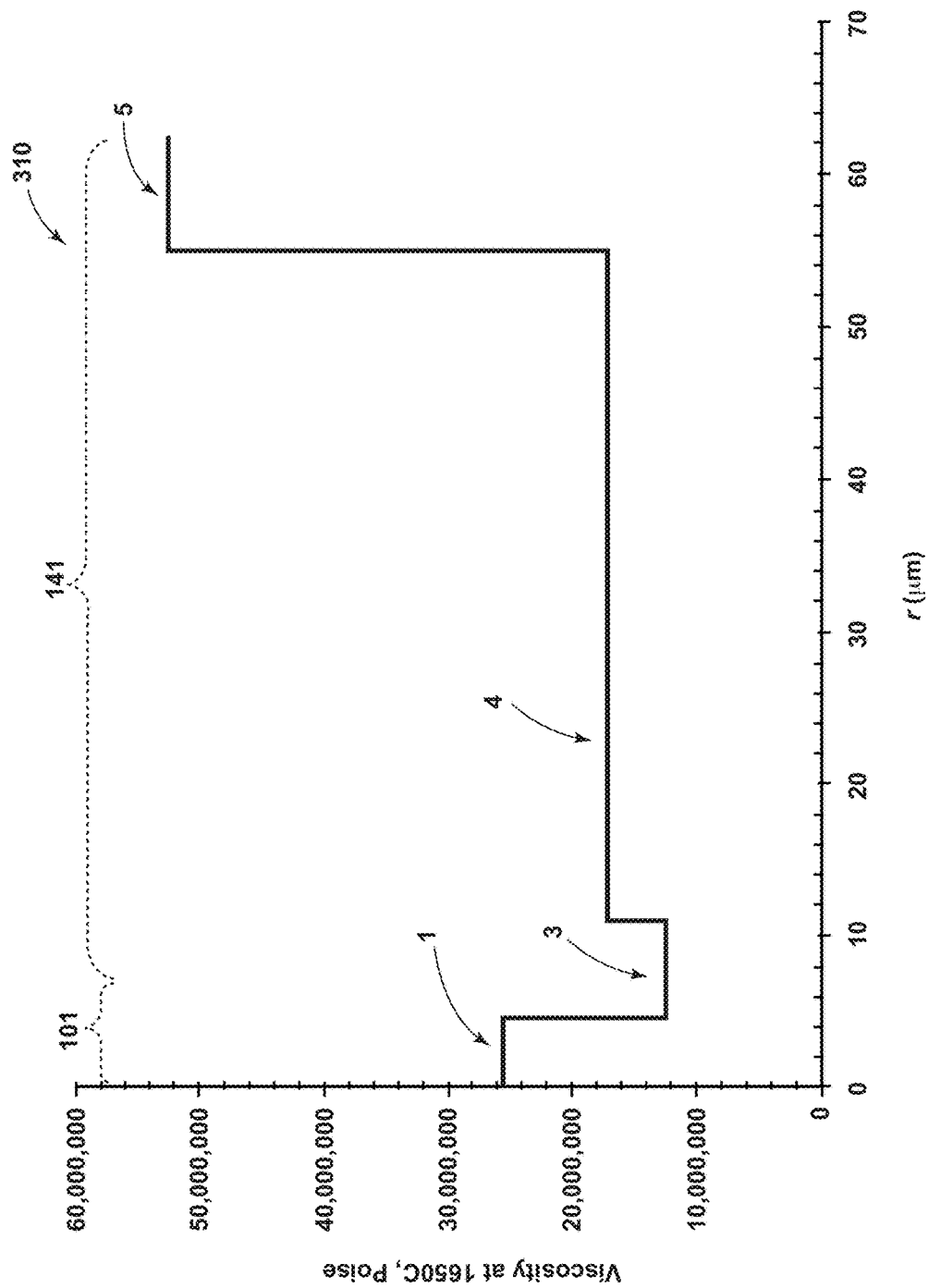
FIG. 2A is a schematic diagram that depicts viscosity at 1650° C. as a function of fiber radius for the optical fiber depicted in FIG. 2.

As used herein, the stiff outer cladding portion (i.e., a stress relieving layer) in the cladding 141 is "stiff" in the sense that it possesses a higher viscosity during processing than the other regions of the optical fibers 300, 310 and 320. Accordingly, the stiff outer cladding portion of the cladding 141 can have a higher viscosity at 1650° C. compared to at least one of the core region 101, and other portions of the cladding 141, as present (e.g., cladding portions corresponding to the relative refractive index profiles 2 and 3). As an example, FIG. 2A depicts viscosity as a function of fiber radial distance for a co-doped optical fiber 310 having a stiff outer cladding portion. In FIG. 2A, the viscosity of stiff outer cladding portion (i.e., corresponding to the relative refractive index profile 5) is 5.3×10$^7$ Poise, the viscosity of the other portions of the cladding 141 corresponding to refractive index profiles 3 and 4 are 1.3×10$^7$ and 1.7×10$^7$ Poise, respectively, and the viscosity of the core 101 is 2.6×10$^7$ Poise. In some embodiments, the viscosity ratio, $\eta_{(oc/core)}$, of the stiff outer cladding portion in the cladding 141 to the core region 101 (i.e., $\eta_{(oc/core)}$=viscosity of the stress relieving layer)/(viscosity of the core region 101) is greater than or equal to 1.1. In some embodiments, the viscosity ratio, $\eta_{(oc/core)}$, ≥1.5. In some embodiments, the viscosity ratio, $\eta_{(oc/core)}$, ≥2.

Referring again to the fibers 300, 310, 320 and 600 (see FIGS. 1-4), in some embodiments, the difference in viscosity (at 1650° C.) of the stiff outer cladding portion corresponding to relative refractive index profile 5 and the viscosity (at 1650° C.) of any one, or the combination, of the core 101 and the portions of the cladding 141 corresponding to the relative refractive index profiles 2, 3 and 4 is ≥0.1e$^7$ Poise. In some embodiments, the difference in viscosity (at 1650° C.) of the stiff outer cladding portion corresponding to relative refractive index profile 5 and the viscosity (at 1650° C.) of any one, or the combination, of the core 101 and the portions of the cladding 141 corresponding to the relative refractive index profiles 2, 3 and 4 is ≥0.2e$^7$ Poise. In some embodiments, the difference in viscosity (at 1650° C.) of the stiff outer cladding portion corresponding to relative refractive index profile 5 and the viscosity (at 1650° C.) of any one, or the combination, of the core 101 and the portions of the cladding 141 corresponding to the relative refractive index profiles 2, 3 and 4 is ≥0.5e$^7$ Poise. In some embodiments, the difference in viscosity (at 1650° C.) of the stiff outer cladding portion corresponding to relative refractive index profile 5 and the viscosity (at 1650° C.) of any one, or the combination of, the core 101 and the portions of the cladding 141 corresponding to the relative refractive index profiles 2, 3 and 4 is ≥1e$^7$ Poise, and ≥1e$^8$ Poise in certain implementations. In some additional aspects, the difference in viscosity (at 1650° C.) of the stiff outer cladding portion corresponding to relative refractive index profile 5 and the viscosity (at 1650° C.) of any one, or the combination of, the core 101 and the portions of the cladding 141 corresponding to the relative refractive index profiles 2, 3 and 4 is ≥0.1e$^7$ Poise and ≤1.6e$^8$ Poise. In some other implementations, the difference in viscosity (at 1650° C.) of the stiff outer cladding portion corresponding to relative refractive index profile 5 and the viscosity (at 1650° C.) of any one, or the combination, of the core 101 and the portions of the cladding 141 corresponding to the relative refractive index profiles 2, 3 and 4 is ≥0.1e⁷ Poise and ≤1e⁷ Poise. As used herein, "1e⁷" and "1e⁸" are scientific notations that correspond to $1\times10^7$ and $1\times10^8$, respectively.

The local viscosity (at 1650° C., in Poise) at any radial location of the fibers 300, 310 and 320 is estimated as a function of the local glass composition for a given fiber layer. For example, the local viscosity can be given by the following relation in Equation (7) as:

$$\eta(\text{in Poise}) = 10^{\wedge}[\log [\eta_0] - 0.0319[\text{GeO}_2] - 0.058[\text{Cl}] - 0.4424[\text{F}] + 3.02[\text{N}]] \quad (7)$$

where log is the logarithm in base 10, [GeO$_2$], [Cl], [F] and [SiON] are the local weight % of germania, chlorine, fluorine and SiON dopants, respectively. In addition, $\eta_0$ is the viscosity of pure silica (i.e., silica glass with no dopants) is given in Equation (8) as:

$$\eta_0(\text{in Poise}) = \text{Exp}\left[-13.738 + \left(\frac{60604.7}{T}\right)\right] \quad (8)$$

where T is the temperature in degrees Kelvin, K.

The co-doped optical fibers 300, 310, 320 and 600 configured for single mode operation can also have low bend loss. As used herein, "bend loss" refers to a macrobend loss value for the optical fibers, as measured at 1550 nm in units of dB/turn. In some embodiments, optical fiber designs configured as fiber 300 can have a macrobend loss of ≤5 dB/turn on a 15 mm diameter mandrel. According to certain embodiments, the macrobend loss for the fibers is ≤2 dB/turn on a 15 mm diameter mandrel, ≤1.5 dB/turn on a 20 mm diameter mandrel, ≤0.5 dB/turn on a 20 mm diameter mandrel, ≤0.025 dB/turn on a 30 mm diameter mandrel, and ≤0.01 dB/turn on a 30 mm diameter mandrel. In some embodiments, the optical fiber designs configured as fibers 310 and 320 can have exhibit a macrobend loss of ≤1.5 dB/turn on a 10 mm diameter mandrel, ≤1 dB/turn on a 10 mm diameter mandrel, ≤1.5 dB/turn on a 15 mm diameter mandrel, ≤1 dB/turn on a 15 mm diameter mandrel, ≤0.5 dB/turn on a 15 mm diameter mandrel, ≤0.5 dB/turn on a 20 mm diameter mandrel, ≤0.2 dB/turn on a 20 mm diameter mandrel, ≤0.1 dB/turn on a 20 mm diameter mandrel, ≤0.025 dB/turn on a 30 mm diameter mandrel, and ≤0.01 dB/turn on a 30 mm diameter mandrel.

The fibers disclosed herein, including fibers 300, 310, 320 and 600, may be drawn from optical fiber preforms made using conventional manufacturing techniques and using known fiber draw methods and apparatus, for example as are disclosed in U.S. Pat. Nos. 7,565,820, 5,410,567, 7,832,675, and 6,027,062, the specifications of which are hereby incorporated by reference. In particular, co-doped optical fibers 300, 310, 320 and 600 can be pulled from a root portion of the optical fiber preform by a tractor within a draw furnace. After leaving the draw furnace, the bare optical fiber encounters a diameter monitor (D) which provides a signal that is used in a feedback control loop to regulate the speed of the tractor to maintain a constant fiber diameter. The bare optical fiber then passes through a fiber tension measurement device (T) that measures the tension of the optical fiber caused by pulling the fiber from the preform. This tension can increase depending on the speed of the fiber draw, the temperature and viscosity of the root of the preform, etc. One example of a fiber tension measurement device is disclosed in European Patent No. EP 0479120 A2, which is incorporated herein by reference. The optical fibers disclosed herein, including fibers 300, 310, 320 and 600 can be drawn from such preforms and coated with standard primary and secondary urethane acrylate coatings.

Although the co-doped core regions 101 of the fibers 300, 310, 320 and 600 disclosed herein may optionally contain some level of alkali, the embodiments disclosed herein may employ core regions which are substantially free of alkali, and in many embodiments the core regions preferably contain no alkali.

Referring again to FIGS. 1-4, each of the co-doped fibers 300, 310, 320 and 600 can be configured to exhibit an attenuation of less than about 0.17 dB/km at a wavelength of 1550 nm. These co-doped fibers include a core region 101 in the fiber that comprises silica co-doped with fluorine and chlorine. The fibers also include a first cladding region 141 in the fiber that surrounds the core region 101. Further, the core region 101 has a relative refractive index of about −0.10% to about +0.05% compared to pure silica. In addition, the first cladding 141 can include a depressed region having a relative refractive index that is substantially constant and lower than the relative refractive index profile 1 of the core region 101. For example, the relative refractive index profile 4 of the co-doped fiber 300 depicted in FIG. 1 corresponds to such a depressed region. Similarly, the relative refractive index profile 3 of the co-doped fibers 310 and 320 depicted in FIGS. 2 and 3 correspond to such depressed regions. In addition, the relative refractive index profile 2 of the co-doped fiber 600 depicted in FIG. 4 corresponds to such a depressed region.

As depicted in exemplary fashion within FIGS. 1-4, each of the co-doped fibers 300, 310, 320 and 600 can be configured to exhibit an attenuation of less than about 0.17 dB/km at a wavelength of 1550 nm. These co-doped fibers include a core region 101 in the fiber that comprises silica co-doped with fluorine and chlorine. The fibers also include a first cladding region 141 in the fiber that surrounds the core region 101. Further, the core region 101 as depicted in FIGS. 1-4 has a step-like refractive index profile having an alpha of about 12 or greater. In addition, the first cladding 141 includes a depressed region having a relative refractive index that is substantially constant and lower than a relative refractive index of the core region 101 (e.g., the relative refractive index profile 4 of the co-doped fiber 300 depicted in FIG. 1).

Referring further to FIGS. 1-4, each of the co-doped fibers 300, 310, 320 and 600 can be configured for few-mode operation. Such fibers each include core region 101 comprising silica co-doped with fluorine and chlorine. These few-moded fibers also include a core region 101 that is configured (a) to transmit optical data in greater than 2 and less than 8 modes at a wavelength of 1550 nm, (b) with a relative refractive index of about −0.10% to about +0.05% compared to pure silica, and (c) with a radius of about 6.0 microns to about 50 microns. The fibers further include a first cladding region 141 in the fiber that surrounds the core region 101. The first cladding region 141 includes a depressed region having a relative refractive index that is substantially constant and lower than a relative refractive index of the core region 101 (e.g., the relative refractive index profile 4 of the co-doped fiber 300 depicted in FIG. 1). In addition, these co-doped fibers configured for few mode operation have an attenuation of less than about 0.17 kB/km at a wavelength of 1550 nm.

The co-doped fibers 300, 310, 320, and 600 disclosed herein, along with other co-doped optical fibers consistent with these embodiments, utilize chlorine concentrations at about 1.2 wt % or higher, which reflect chlorine concentration levels significantly higher than the chlorine levels utilized in some conventional optical fibers. Such high chlorine levels in the co-doped fibers disclosed herein can be achieved by optimizing a number of variables according to the fiber processing methods also disclosed herein. For example, higher temperatures may be used to vaporize $SiCl_4$ liquid (e.g., a precursor for doping chlorine within a silica core region of an optical fiber), resulting in increased $SiCl_4$ concentration levels in the vapor phase. The vaporizer temperature in some embodiments is higher than 40° C., and in some other embodiments it is higher than 45° C. In further aspects, the vaporizer temperature is higher than 50° C., and in yet other embodiments it is higher than 57° C. As a result, the increased $SiCl_4$ concentration levels may be employed in the consolidation furnace (e.g., as typically employed for processing of the fibers). In some embodiments of the methods disclosed herein, the fraction of the gas through the vaporizer/bubbler to the total flow to the furnace is higher than 30%; in other embodiments, the fraction of the gas through the vaporizer/bubbler to the total flow to the furnace is higher than 50%; and in yet other embodiments, the fraction of the gas through the vaporizer/bubbler to the total flow to the furnace is higher than 80%. The remainder of the gas may be He gas. In certain other embodiments, the fraction of the gas through the vaporizer/bubbler to the total flow to the furnace is at or approaches 100%

In some of the co-doped fiber process embodiments disclosed herein, the chlorine doping of the core region using $SiCl_4$ occurs can be conducted during the sintering process. That is, the soot preform is being doped prior to and/or up until the point in which the soot preform transitions to a closed pore state and becomes a fully sintered preform in the presence of $SiCl_4$ at temperatures higher than 1300° C. In other embodiments, the chlorine doping is conducted at temperatures higher than 1375° C. In some additional embodiments, the chlorine doping occurs during the sintering process at temperatures higher than 1400° C.

In certain aspects of the methods for making the co-doped optical fibers disclosed herein, high soot surface area preforms (i.e., as compared to preform surface areas used in conventional optical fiber processing) can be employed for doping the core region using $SiCl_4$. In some embodiments, the surface area of the soot preform is larger than 10 $m^2/gm$, larger than 20 $m^2/gm$, larger than 25 $m^2/gm$, or even larger than 50 $m^2/gm$. In certain other embodiments, the surface area of the soot preform can be larger than 90 $m^2/gm$. The surface area of the preform can be measured using BET surface area characterization techniques, as understood within the operative field of the disclosure.

The amount of $SiCl_4$ doped within the core region of the fibers disclosed herein can also be increased by treating a silica soot preform with multiple cycles of successive exposures to a mixture of $SiCl_4$ and $H_2O$ (and/or $O_2$) prior to full consolidation of the preform. Without wishing to be bound by theory, it is believed that the treatment of the silica soot surface with $SiCl_4$ results in doping of chlorine by attaching —$SiCl_3$ groups at the location of OH groups on the silica soot surface and/or by reacting Si—O—Si groups with the silica soot surface to form an $SiCl^+$ group and $SiOCl_3$. Each of the Cl molecules in the attached —$SiCl_3$ group can be converted to an OH group by treating it with water (or oxygen to form another $SiO_2$ molecule on the surface), which then in turn become the reactive sites for attaching additional —$SiCl_3$ groups upon subsequent treatment with the $SiCl_4$ dopant precursor. By exploiting the procedure in which the preform is exposed to multiple cycles of the successive $SiCl_4$ and $H_2O$ (and/or $O_2$) environments, it is possible to create a cascading structure and incorporate high amounts of chlorine on the soot particle surface. This results in significantly higher chlorine doping levels in the consolidated glass compared to doped chlorine levels reported previously in the literature and/or employed in conventional optical fiber processing methods.

Other methods that can be used to increase the soot surface area of the preforms employed in the high chlorine core region doping methods disclosed herein include: 1) a low-density soot laydown step; 2) a high surface area soot pressing step; and/or 3) impregnating the soot with a sol-gel silica (e.g., TEOS, pre- or post-hydrolyzed) or nano-particle silica such as Ludox® colloidal silica.

Using the methods outlined above, some embodiments of these methods can be used to produce consolidated glass (e.g., serving as the core region of a co-doped optical fiber) with a chlorine concentration of about 1.2 wt. % or higher, about 1.3 wt. % or higher, and about 1.4 wt. % or higher. In some embodiments, the doped chlorine concentration in the consolidated glass is about 1.5 wt. % or higher, about 2 wt. % or higher, about 2.5 wt. % or higher, and even about 3 wt. % or higher.

The techniques disclosed herein to co-dope high levels of chlorine in the core region with fluorine provide significant advantages in making low-loss optical fibers. Chlorine is a dopant that results in a low Rayleigh scattering loss by lowering the density fluctuations contribution, without increasing concentration fluctuations within the core region. In some conventional optical fiber configurations, core regions have been employed with chlorine concentrations of less than 1.2 wt. % (i.e., as a single dopant). For such designs, fluorine has been used in the cladding to provide the index differential between the core and the cladding necessary for the proper characteristics to operate as an optical fiber. However, because of the large viscosity mismatch between the core and the cladding, significant stresses are induced at the draw. The stresses diminish the relative refractive index-differential between the core and the inner cladding region through the stress-optic effect and also negatively impact attenuation by impeding the structural relaxation of the glass in the glass transition region.

For example, a conventional optical fiber having 1.1 wt. % (1.8 mole %) chlorine in the core and 1.4 wt. % (4.4 mole %) fluorine in the adjacent cladding will result in a compositional index differential between the core and the cladding which results in 0.505%Δ. However, when this fiber is drawn at 150 g tension, the effective index differential in the fiber is greatly diminished due to the stress-optic effect and an actual refractive index delta percent of 0.296%Δ is achieved. This problem is believed to be due to the core glass being stiffer than the cladding glass. In contrast, the co-doped optical fiber configurations disclosed herein are better suited to minimize the stress-optic effect by reducing the viscosity mismatch between the core region and the cladding. Given the higher chlorine levels in the co-doped core region that are feasible through the methods disclosed herein, fluorine can be introduced into the cladding at lower levels than in conventional optical fibers to produce the effective index differential necessary for operation as an optical fiber. With lower levels of fluorine present in the cladding, the viscosity mismatch between the core region and the cladding can be reduced, leading to reduced stress optic effects for the co-doped fibers disclosed herein.

Figure 5:
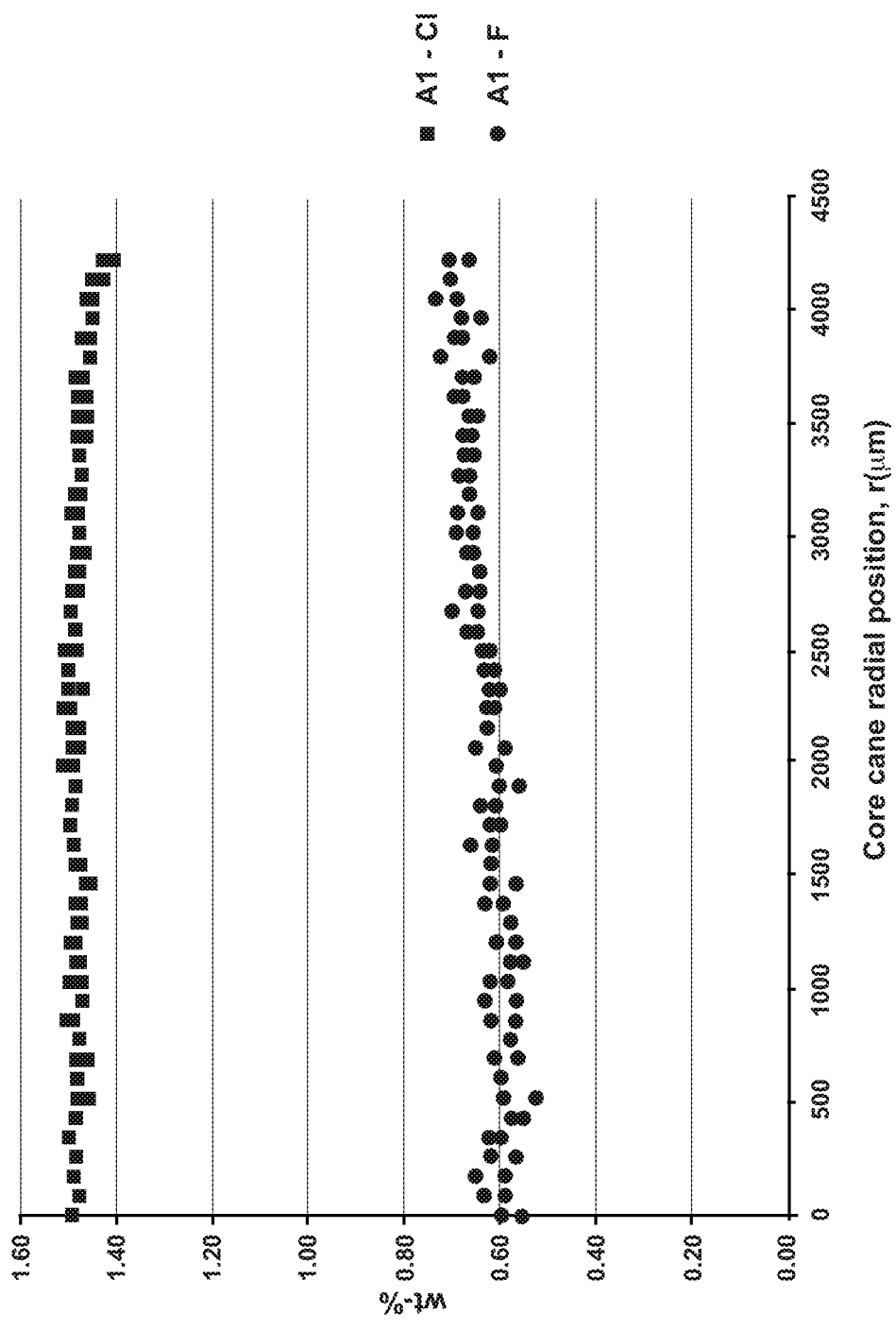
FIG. 5 is a plot of dopant concentration as a function of radial distance within a core cane suitable for drawing into co-doped optical fibers.

Referring to FIG. 5, a plot is provided of dopant concentration (wt. %) as a function of radial distance (μm) within a co-doped core cane suitable for drawing into a core region (e.g., core region 101) of the co-doped optical fibers (e.g., fibers 300, 310, 320 and 600) according to aspects of this disclosure. The core cane was processed and doped according to similar conditions as described below for the manufactured core cane detailed in Example 1.

As shown in FIG. 5, dopant concentration levels of wt. % Cl ("A1-Cl") and F1 ("A1-F") are depicted from the center of the core cane to an outer radius of about 4200 μm. The Cl concentration level is about 1.5 wt. % to about 1.4 wt. % and the F concentration level is about 0.6% to about 0.7%. It is also apparent that these concentration levels as a function of core cane radial distance are indicative of a step-like alpha profile, with an alpha greater than 12. At these core cane doping concentrations, it is expected that a 0.35% Δ difference between the core region and the cladding would be necessary for effective waveguide behavior suitable for single mode operation of the fiber.

Figure 6:
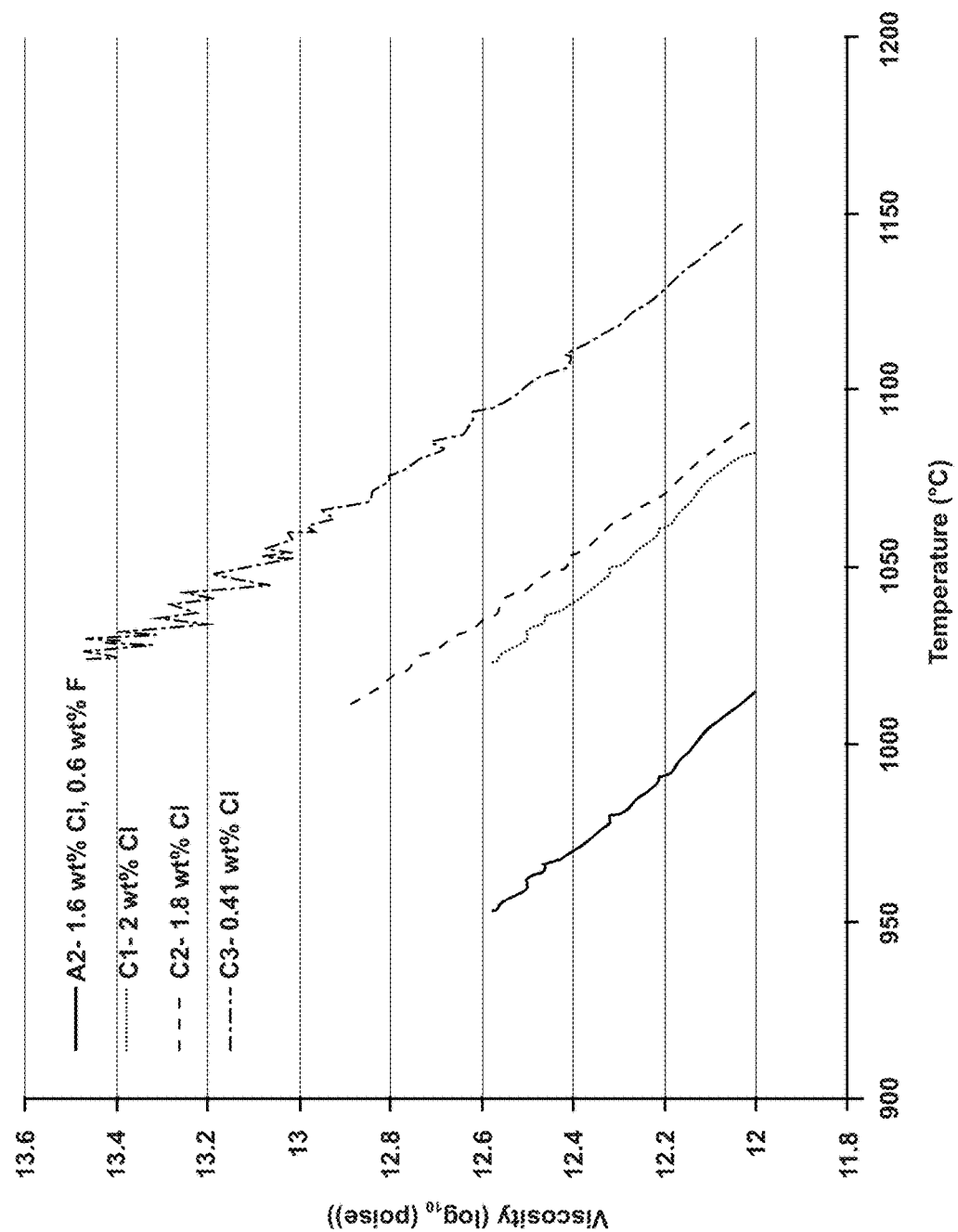
FIG. 6 is a plot of core cane viscosity as a function of temperature for comparative single-doped core cane examples and a co-doped core cane aspect of the disclosure.

Referring to FIG. 6, a plot is provided of core cane viscosity ($\log_{10}$ poise) as a function of temperature (° C.) for comparative single-doped core cane examples (Exs. "C1," "C2" and "C3") and a co-doped core cane aspect of the disclosure ("A2"). The core canes employed in FIG. 6 were processed and doped according to the conditions described below for the manufactured core cane in Example 1. Note that the Exs. C1-C3, with Cl as a single dopant, were processed with only $Cl_2$ and $SiCl_4$ gases as the dopant sources (i.e., no $SiF_4$ was present).

As FIG. 6 indicates, the C1 core cane samples have a Cl dopant concentration of about 2.0 wt. %, the C2 core cane samples have a Cl dopant concentration of about 1.8 wt. % and the C3 core cane samples have a Cl dopant concentration of about 0.41 wt. %. In contrast, the A2 core cane sample reflects a co-doping configuration with about 1.6 wt. % Cl and about 0.6 wt. % F dopant concentrations. The viscosity data shown in FIG. 6 demonstrates that the comparative fluorine-doped core canes exhibit higher viscosity levels than the co-doped core cane. In addition, the co-doped core cane possesses a lower level of chlorine compared to two of the comparative examples, yet still exhibits a lower viscosity than these core canes. The lower viscosity levels observed in the co-doped core cane ("A2") results in increased glass relaxation during the fiber drawing process, resulting in a lower fictive temperature and correspondingly low fiber attenuation levels.

Figure 7:
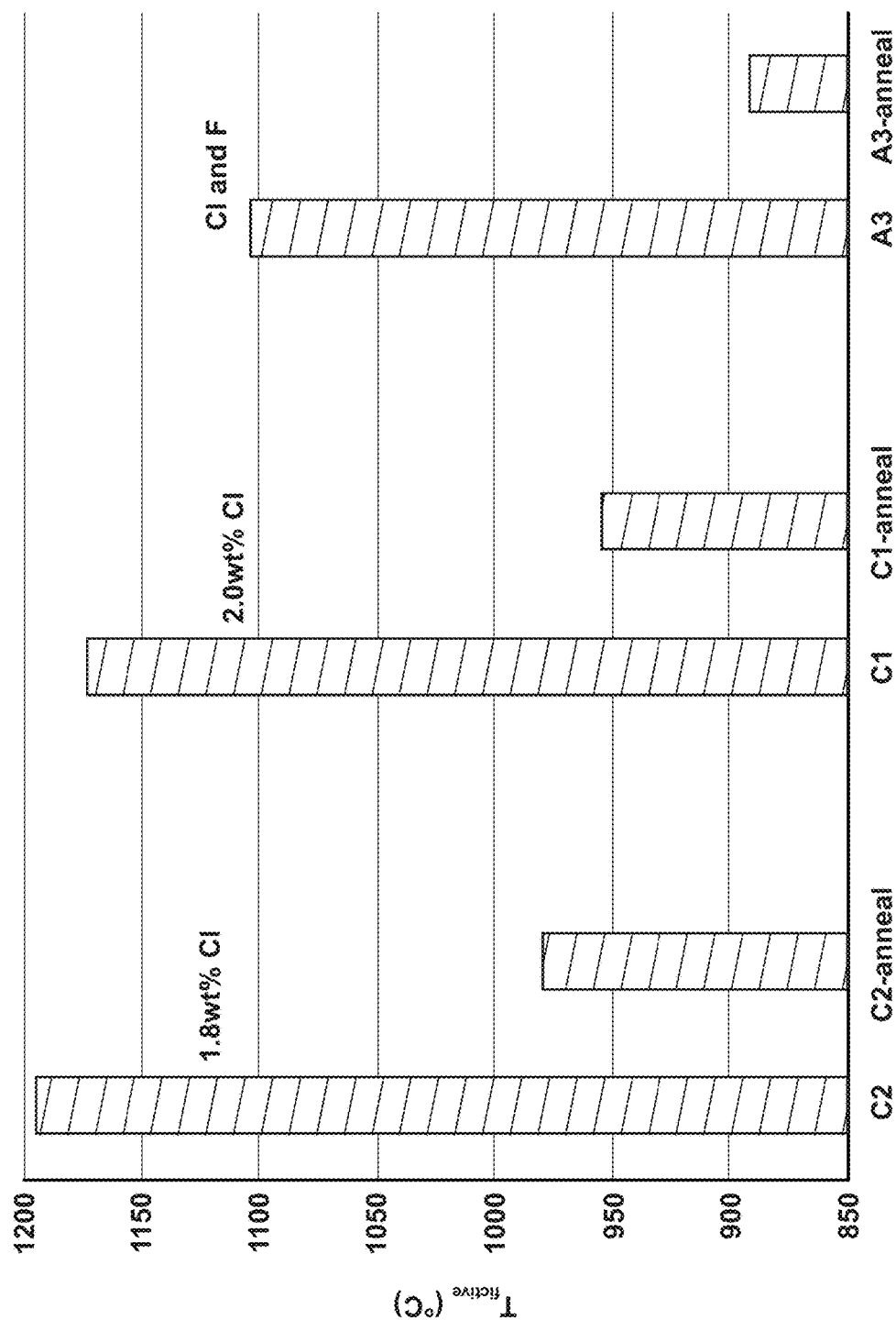
FIG. 7 is a bar chart of fictive temperature for comparative single doped core cane examples and a co-doped core cane aspect of the disclosure in as-formed and post-anneal states.

Referring to FIG. 7, a bar chart is provided of fictive temperature for two of the comparative single doped core cane examples from FIG. 6 ("C1" and "C2"), and a co-doped core cane aspect ("A3") of the disclosure in as-formed and post-anneal states. The core canes employed in FIG. 7 were processed and doped according to the conditions described for the manufactured core cane in Example 1 below (i.e., as modified for the comparative single doped core cane examples as described earlier). In addition, the core canes were annealed according to the conditions described for the manufactured core cane in Example 1 below.

As FIG. 7 indicates, the fictive temperature of the chlorine and fluorine co-doped core cane samples ("A3") was lower by as much as 80° C. for both of the as-formed and post-anneal states compared to the fictive temperatures observed for the comparative core cane samples possessing a single, chlorine dopant. It is expected that these observed fictive temperature differences between the co-doped core cane samples and the comparative core cane samples with a single dopant will also be manifested in optical fibers drawn from these canes, at least based on increased glass relaxation levels during the fiber drawing process.

EXAMPLES

Various embodiments of the foregoing fibers will be further clarified by the following examples of modeled fibers. It will be apparent to those skilled in the art that various modifications and variations can be made without departing from the spirit or scope of the present disclosure. All of the examples listed below have an outer radius of 62.5 microns, and a fiber diameter of 125 microns. Further, all optical parameters provided for the fibers modeled below are at 1550 nm and the LP01 mode, unless otherwise stated.

Examples of modeled chlorine and fluorine co-doped core, fluorine-doped clad, single-moded (SM) and few-moded (FM) optical fibers and properties are shown below in Tables 1-6, consistent with one or more of the co-doped fibers 300, 310, 320 and 600 described in the foregoing aspects of the disclosure.

Set forth in Tables 1-3 below are the following parameters and fiber dimensions for various co-doped SM fibers: $\Delta 1_{max}$ (%) of the core, core alpha, core dopants of Cl and F in the core (wt. %), radius $r_1$ of the core (μm), the cladding outer radius $r_4$ (μm), cladding delta (%), 22 meter cable cutoff wavelength (nm), mode field diameter, MFD (μm) at 1310 nm, effective area, Aeff at 1310 nm ($\Xi m^2$), dispersion (ps/nm/km) and dispersion slope (ps/nm$^2$/km) at 1310 nm, zero dispersion wavelength, Lambda zero (nm), mode field diameter, MFD (μm) at 1550 nm, effective area, Aeff at 1550 nm ($\Xi m^2$), dispersion (ps/nm/km) and dispersion slope (ps/nm$^2$/km) at 1550 nm, attenuation at 1310 and 1550 nm (dB/km). Further, in Table 2, the radius of the moat $r_3$ (μm) is provided for both of the listed fiber examples (Exs. 9 and 10), and the inner radius $r_3$ (μm) of the stiff outer cladding portion is additionally provided for one of the listed fiber examples (Ex. 10). Table 2 also includes viscosity data (in Poise at 1650° C.) for the core, moat, cladding and stiff outer cladding portion, as applicable to the listed fiber examples. In Table 3, the inner and outer radii of the trench, $r_2$ and $r_3$ (μm), are also provided. Also included in Tables 1-3 are bend loss values at 1550 nm in dB/turn for 10, 15, 20 and 30 mm diameter mandrels. Finally, the designation "N/A" indicates that the parameter is not applicable to the particular fiber example.

TABLE 1

Properties of SM optical fibers having Cl and F co-doped core regions (e.g., co-doped fiber 300 in FIG. 1).

| Parameter | Ex. 1 | Ex. 2 | Ex. 3 | Ex. 4 | Ex. 5 | Ex. 6 | Ex. 7 | Ex. 8 |
|---|---|---|---|---|---|---|---|---|
| Core delta $\Delta 1_{max}$ (%) | 0.00 | 0.00 | 0.00 | 0.05 | −0.05 | −0.05 | 0.00 | 0.00 |
| Core radius $r_1$ (μm) | 4.5 | 4.8 | 6 | 4.4 | 4.4 | 4.4 | 4.3 | 4.75 |
| Cladding outer radius $r_4$ (μm) | 62.5 | 62.5 | 62.5 | 62.5 | 62.5 | 62.5 | 62.5 | 62.5 |
| Core alpha | 20 | 20 | 20 | 20 | 20 | 10 | 100 | 6 |
| Core dopant Cl (wt. %) | 1.55 | 1.55 | 1.55 | 1.74 | 1.55 | 1.55 | 1.55 | 1.55 |
| Core dopant F (wt. %) | 0.50 | 0.50 | 0.50 | 0.40 | 0.34 | 0.34 | 0.50 | 0.50 |
| Cladding delta (%) | −0.34 | −0.30 | −0.25 | −0.30 | −0.41 | −0.41 | −0.34 | −0.38 |

TABLE 1-continued

Properties of SM optical fibers having Cl and F co-doped core regions
(e.g., co-doped fiber 300 in FIG. 1).

| Parameter | Ex. 1 | Ex. 2 | Ex. 3 | Ex. 4 | Ex. 5 | Ex. 6 | Ex. 7 | Ex. 8 |
|---|---|---|---|---|---|---|---|---|
| 22 meter cable cutoff (nm) | 1169 | 1172 | 1358 | 1160 | 1176 | 1172 | 1161 | 1174 |
| MFD at 1310 nm (μm) | 9.2 | 9.8 | 11.3 | 9.1 | 9.0 | 9.0 | 9.2 | 8.9 |
| Aeff at 1310 nm (μm$^2$) | 67.2 | 76.3 | 104.2 | 64.8 | 63.9 | 64.1 | 66.7 | 61.5 |
| Dispersion at 1310 nm (ps/nm/km) | 1.4 | 1.7 | 3.1 | 1.0 | 1.5 | 1.4 | 1.3 | 1.1 |
| Dispersion slope at 1310 nm (ps/nm$^2$/km) | 0.16 | 0.14 | 0.11 | 0.23 | 0.15 | 0.16 | 0.17 | 0.22 |
| Lambda zero (nm) | 1302 | 1298 | 1283 | 1306 | 1300 | 1301 | 1302 | 1305 |
| Attenuation at 1310 nm (dB/km) | 0.3 | 0.3 | 0.3 | 0.3 | 0.3 | 0.3 | 0.3 | 0.3 |
| MFD at 1550 nm (μm) | 10.5 | 11.1 | 12.6 | 10.3 | 10.2 | 10.2 | 10.4 | 10.1 |
| Aeff at 1550 nm (μm$^2$) | 83.9 | 95.1 | 124.5 | 81.0 | 79.6 | 80.2 | 83.4 | 77.3 |
| Dispersion at 1550 nm (ps/nm/km) | 17.7 | 18.2 | 20.3 | 17.3 | 17.6 | 17.6 | 17.6 | 17.3 |
| Slope at 1550 nm (ps/nm$^2$/km) | 0.057 | 0.058 | 0.060 | 0.056 | 0.056 | 0.056 | 0.057 | 0.057 |
| Attenuation at 1550 nm (dB/km) | <0.17 | <0.17 | <0.17 | <0.17 | <0.17 | <0.17 | <0.17 | <0.17 |
| 10 mm diameter bend loss (dB/turn) | 8.8 | 17.7 | 21.0 | 7.9 | 6.2 | 9.3 | 9.0 | 5.5 |
| 15 mm diameter bend loss (dB/turn) | 1.8 | 4.0 | 4.8 | 1.6 | 1.2 | 1.9 | 1.9 | 1.1 |
| 20 mm diameter bend loss (dB/turn) | 0.38 | 0.89 | 1.09 | 0.34 | 0.25 | 0.41 | 0.39 | 0.22 |
| 30 mm diameter bend loss (dB/turn) | 0.006 | 0.017 | 0.022 | 0.005 | 0.004 | 0.007 | 0.006 | 0.003 |

TABLE 2

Properties of SM optical fibers having Cl and F co-doped core
regions and a moat, with and without a stiff outer cladding
portion (e.g., co-doped fiber 310 in FIGS. 2 and 2A).

| Parameter | Ex. 9 (see FIG. 2) | Ex. 10 (see FIGS. 2, 2A) |
|---|---|---|
| Core delta Δ1$_{max}$ (%) | 0.00 | 0.00 |
| Core radius r$_1$ (μm) | 4.70 | 4.60 |
| Core alpha | 20 | 20 |
| Core dopant Cl (wt. %) | 1.55 | 1.55 |
| Core dopant F (wt. %) | 0.50 | 0.50 |
| Moat delta (%) | −0.38 | −0.44 |
| Moat dopant F (wt. %) | 1.23 | 1.42 |
| Moat radius r$_3$ (μm) | 14.9 | 11.0 |
| Outer cladding delta (%) | −0.34 | −0.34 |
| Outer cladding dopant F (wt. %) | 1.10 | 1.10 |
| Cladding outer radius r$_4$ (μm) | 62.5 | 62.5 |
| Stiff outer cladding portion delta (%) | N/A | 0.00 |
| Stiff outer cladding portion dopant F (wt. %) | N/A | 0 |
| Stiff outer cladding portion inner radius r$_5$ (μm) | N/A | 55 |
| 22 meter cable cutoff (nm) | 1256 | 1232 |
| MFD at 1310 nm (μm) | 9.1 | 8.6 |
| Aeff at 1310 nm (μm$^2$) | 66.2 | 60.4 |
| Dispersion at 1310 nm (ps/nm/km) | 2.5 | 2.9 |
| Dispersion slope at 1310 nm (ps/nm$^2$/km) | 0.29 | 0.084 |
| Lambda zero (nm) | 1302 | 1302 |
| Attenuation at 1310 nm (dB/km) | 0.3 | 0.3 |
| MFD at 1550 nm (μm) | 10.1 | 9.6 |
| Aeff at 1550 nm (μm$^2$) | 79.9 | 72.2 |
| Dispersion at 1550 nm (ps/nm/km) | 18.9 | 18.9 |
| Slope at 1550 nm (ps/nm$^2$/km) | 0.06 | 0.05 |
| Attenuation at 1550 nm (dB/km) | <0.17 | <0.17 |
| 10 mm diameter bend loss (dB/turn) | 3.6 | 3.6 |
| 15 mm diameter bend loss (dB/turn) | 0.7 | 0.7 |
| 20 mm diameter bend loss (dB/turn) | 0.15 | 0.16 |
| 30 mm diameter bend loss (dB/turn) | 0.003 | 0.003 |
| Core viscosity at 1650° C. (Poise) | 2.6 × 10$^7$ | 2.6 × 10$^7$ |
| Moat viscosity at 1650° C. - between r1 and r3 (Poise) | 1.3 × 10$^7$ | 1.3 × 10$^7$ |
| Cladding viscosity at 1650° C. - between r3 and r4 (Poise) | 1.7 × 10$^7$ | N/A |
| Cladding viscosity at 1650° C. - between r3 and r5 (Poise) | N/A | 1.7 × 10$^7$ |
| Stiff outer cladding viscosity at 1650° C. - between r5 and r4 (Poise) | N/A | 5.3 × 10$^7$ |

TABLE 3

Properties of SM optical fibers having Cl and F co-doped core
regions and a trench (e.g., co-doped fiber 320 in FIG. 3).

| Parameter | Ex. 11 | Ex. 12 |
|---|---|---|
| Core delta Δ1$_{max}$ (%) | 0.00 | 0.00 |
| Core radius r$_1$ (μm) | 4.0 | 4.0 |
| Core alpha | 20 | 20 |
| Core dopant Cl (wt. %) | 1.55 | 1.55 |
| Core dopant F (wt. %) | 0.50 | 0.50 |
| Inner cladding delta (%) | −0.34 | −0.34 |
| Trench delta (%) | −0.70 | −0.54 |
| Trench start radius r$_2$ (μm) | 11 | 11 |
| Trench end radius r$_3$ (μm) | 16 | 20 |
| Outer cladding delta (%) | −0.34 | −0.34 |
| Cladding outer radius r$_4$ (μm) | 62.5 | 62.5 |
| 22 meter cable cutoff (nm) | 1167 | 1187 |
| MFD at 1310 nm (μm) | 8.9 | 8.9 |
| Aeff at 1310 nm (μm$^2$) | 61.1 | 61.2 |
| Dispersion at 1310 nm (ps/nm/km) | 0.08 | −0.09 |
| Dispersion slope at 1310 nm (ps/nm$^2$/km) | 0.010 | 0.085 |
| Lambda zero (nm) | 1302 | 1302 |
| Attenuation at 1310 nm (dB/km) | 0.3 | 0.3 |
| MFD at 1550 nm (μm) | 10.2 | 10.2 |
| Aeff at 1550 nm (μm$^2$) | 78.1 | 78.7 |
| Dispersion at 1550 nm (ps/nm/km) | 17.3 | 16.9 |
| Slope at 1550 nm (ps/nm$^2$/km) | 0.063 | 0.061 |
| Attenuation at 1550 nm (dB/km) | <0.17 | <0.17 |
| 10 mm diameter bend loss (dB/turn) | 0.6 | 0.4 |
| 15 mm diameter bend loss (dB/turn) | 0.2 | 0.1 |
| 20 mm diameter bend loss (dB/turn) | 0.04 | 0.02 |
| 30 mm diameter bend loss (dB/turn) | 0.004 | 0.003 |

Tables 4-6 list optical parameters and dimensions for various few-moded (FM) optical fibers consistent with the set of parameters and dimensions provided for the fibers in Tables 1-3. In addition, the FM fibers outlined in Tables 4-6 also include the following additional parameters and dimensions: LP01 cutoff (μm), LP11 cutoff (μm), LP21 cutoff (μm), LP02 cutoff (μm), LP01 MFD at 1550 nm (μm), LP01 Aeff at 1550 nm (Ξm$^2$), LP01 dispersion at 1550 nm (ps/nm/km), LP01 slope at 1550 nm (ps/nm$^2$/km), and LP01 attenuation at 1550 nm (dB/km).

TABLE 4

Properties of FM optical fibers having Cl and F co-doped core regions (e.g., co-doped fiber 300 in FIG. 1).

| Parameter | Ex. 13 |
|---|---|
| Core delta $\Delta 1_{max}$ (%) | 0.00 |
| Core radius $r_1$ (μm) | 6.5 |
| Core alpha | 20 |
| Core dopant Cl (wt. %) | 1.55 |
| Core dopant F (wt. %) | 0.50 |
| Cladding delta (%) | −0.45 |
| Cladding outer radius $r_4$ (μm) | 62.5 |
| LP01 cutoff (μm) | 5.0 |
| LP11 cutoff (μm) | 2.18 |
| LP21 cutoff (μm) | 1.37 |
| LP02 cutoff (μm) | 1.37 |
| LP01 MFD at 1550 nm (μm) | 11 |
| LP01 Aeff at 1550 nm (μm$^2$) | 104.1 |
| LP01 dispersion at 1550 nm (ps/nm/km) | 22.8 |
| LP01 slope at 1550 nm (ps/nm$^2$/km) | 0.061 |
| LP01 attenuation at 1550 nm (dB/km) | <0.17 |

TABLE 5

Properties of FM optical fibers having Cl and F co-doped core regions and a moat (e.g., co-doped fiber 310 in FIG. 2).

| Parameter | Ex. 14 | Ex. 15 |
|---|---|---|
| Core delta $\Delta 1_{max}$ (%) | 0.00 | 0.00 |
| Core radius $r_1$ (μm) | 7.3 | 7.4 |
| Core alpha | 20 | 10 |
| Core dopant Cl (wt. %) | 1.55 | 1.55 |
| Core dopant F (wt. %) | 0.50 | 0.50 |
| Moat delta (%) | −0.49 | −0.51 |
| Moat radius $r_3$ (μm) | 15.0 | 15.0 |
| Cladding delta (%) | −0.39 | −0.40 |
| Cladding outer radius $r_4$ (μm) | 62.5 | 62.5 |
| LP01 cutoff (μm) | 5.0 | 5.0 |
| LP11 cutoff (μm) | 2.0 | 1.9 |
| LP21 cutoff (μm) | 1.34 | 1.30 |
| LP02 cutoff (μm) | 1.25 | 1.21 |
| LP01 MFD at 1550 nm (μm) | 11.7 | 11.4 |
| LP01 Aeff at 1550 nm (μm$^2$) | 119 | 111 |
| LP01 dispersion at 1550 nm (ps/nm/km) | 23.4 | 23.4 |
| LP01 slope at 1550 nm (ps/nm$^2$/km) | 0.063 | 0.064 |
| LP01 attenuation at 1550 nm (dB/km) | <0.17 | <0.17 |

TABLE 6

Properties of FM optical fibers having Cl and F co-doped core regions and a trench (e.g., co-doped fiber 320 in FIG. 3).

| Parameter | Ex. 16 |
|---|---|
| Core delta $\Delta 1_{max}$ (%) | 0.00 |
| Core radius $r_1$ (μm) | 7.4 |
| Core alpha | 20 |
| Core dopant Cl (wt. %) | 1.55 |
| Core dopant F (wt. %) | 0.50 |
| Inner cladding delta (%) | −0.45 |
| Trench delta (%) | −0.70 |
| Trench start radius $r_2$ (μm) | 15 |
| Trench end radius $r_3$ (μm) | 20 |
| Outer cladding delta (%) | −0.45 |
| Cladding outer radius $r_4$ (μm) | 62.5 |
| LP01 cutoff (μm) | 5.0 |
| LP11 cutoff (μm) | 2.4 |
| LP21 cutoff (μm) | 1.55 |
| LP02 cutoff (μm) | 1.46 |
| LP01 MFD at 1550 nm (μm) | 12.0 |
| LP01 Aeff at 1550 nm (μm$^2$) | 124.1 |
| LP01 dispersion at 1550 nm (ps/nm/km) | 23.3 |
| LP01 slope at 1550 nm (ps/nm$^2$/km) | 0.063 |
| LP01 attenuation at 1550 nm (dB/km) | <0.17 |

The optical properties of the single-moded (SM) optical fibers in Tables 1-3 demonstrate low attenuation, excellent bend performance and other properties compatible with G.657, G.652 and G.654 specifications. The optical properties of the few-moded (FM) optical fibers in Tables 4-6 demonstrate low attenuation, excellent bend performance, large mode field diameter and effective area.

Examples of manufacturing and processing conditions, and properties, for chlorine and fluorine co-doped core canes are detailed below. These core canes are suitable for drawing co-doped optical fibers consistent with aspects of the disclosure including but not limited to co-doped optical fibers 300, 310, 320 and 600.

Example 1

A 1 meter long 3000 gram silica soot preform having a density of about 0.5 g/cm$^3$ was prepared in a lathe by flame depositing silica soot onto a 10 mm diameter removable alumina rotating bait rod comprising a silica handle. The soot preform was placed into a consolidation furnace and dried and doped at about 1225° C. in a gaseous atmosphere with about 45 vol. % He, 12 vol. % Cl$_2$, about 32 vol. % SiCl$_4$, and about 11 vol. % SiF$_4$. The assembly was then traversed (down-driven) through a hot zone having a peak temperature of about 1500° C. at a temperature ramp rate of about 2.5° C./min in a gaseous atmosphere with about 44 vol. % He, about 41 vol. % SiCl$_4$ and about 15 vol. % SiF$_4$, thus producing a fully densified Cl and F co-doped silica glass core preform.

This preform was placed for about 24 hours in an Ar-purged holding oven set at 1000° C. in order to outgas dissolved He in the glass. The preform was then placed in a redraw furnace set at about 1900° C. A vacuum was then applied to the furnace through the handle to the centerline portion of the preform to collapse the hole in the centerline. The preform was then redrawn into void-free Cl and F co-doped silica glass core canes of about 8.5 mm in diameter by about 1 meter in length.

Microprobe analysis of the resulting core canes demonstrated each cane contained uniform co-doped regions with about 1.5 wt. % Cl and about 0.58 wt. % F. These concentration levels were measured to be uniform across the diameter of the canes.

Refractive index profiles were generated for these canes. The resulting profiles included an about −0.06% delta index (relative to pure silica), existing uniformly across the diameter of these canes.

The fictive temperatures of these canes were also measured by Fourier Transform Infrared Spectroscopy (FTIR) techniques. Fictive temperatures of about 1100° C. were measured for each of the canes. One of these canes was subjected to an annealing process. This cane was placed into a furnace, heated to 1200° C. and held for 1 hour at 1200° C., then cooled to 900° C. at a cooling rate of 100° C. per hour. The cane was then cooled back to about 25° C. overnight. The fictive temperature of the annealed cane was measured to be about 890° C., as also shown in FIG. 7 ("A3-anneal").

It is to be understood that the foregoing is exemplary only and is intended to provide an overview for the understanding of the nature and character of the fibers which are defined by the claims. The accompanying drawings are included to provide a further understanding of the preferred embodiments and are incorporated and constitute part of the specification. The drawings illustrate various features and embodiments which, together with their description, serve to explain the principals and operation. It will be apparent to those skilled in the art that various modifications and variations can be made to the preferred embodiments as described herein without departing from the spirit or scope of the claims.

What is claimed is:

1. An optical fiber, comprising:
a fiber having an attenuation of less than about 0.17 dB/km at a wavelength of 1550 nm, the fiber comprising:
a core region in the fiber having a graded refractive index profile with an alpha of greater than 0.5; and
a first cladding region in the fiber that surrounds the core region,
wherein the core region comprises silica co-doped with chlorine at about 1.2% or greater by weight and fluorine between about 0.1% and about 1% by weight.

2. The fiber according to claim 1, wherein the core region has a relative refractive index, $\Delta_1$, of about −0.20% to about +0.1% compared to pure silica.

3. The fiber according to claim 1, wherein the first cladding region comprises (a) an inner cladding region that surrounds the core region and has a relative refractive index, $\Delta_2$, and (b) a depressed cladding region that surrounds the inner cladding region and has a relative refractive index, $\Delta_3$; the core region has a relative refractive index, $\Delta_1$; and $\Delta_1 \geq \Delta_2 > \Delta_3$.

4. The fiber according to claim 3, wherein the first cladding region further comprises an outer cladding region having a relative refractive index, $\Delta_4$, and further wherein $\Delta_4 > \Delta_3$.

5. The fiber according to claim 1, wherein the core region comprises silica co-doped with chlorine and fluorine, the chlorine at about 2.5% or greater by weight.

6. The fiber according to claim 1, wherein the core region comprises silica co-doped with fluorine and chlorine such that the sum of the fluorine and chlorine in weight percent divided by the fluorine in weight percent is greater than a factor about 1.5.

7. The fiber according to claim 1, wherein the fiber further comprises a mode field diameter (MFD) from about 8.2 μm to about 9.5 μm at 1310 nm.

8. The fiber according to claim 7, wherein the fiber further comprises a macrobend loss at 1550 nm of ≤1.5 dB/turn on a 20 mm diameter mandrel.

9. The fiber according to claim 4, wherein the viscosity at 1650° C. of the outer cladding region is greater than the viscosity at 1650° C. of at least one of the core region, the inner cladding region and the depressed cladding region.

10. The fiber according to claim 4, wherein the difference in viscosity at 1650° C. of the outer cladding region is ≥1×10⁶ Poise and ≤1.6×10⁸ Poise of the viscosity at 1650° C. of at least one of the core region, the inner cladding region and the depressed cladding region.

11. The fiber according to claim 4, wherein the ratio in viscosity at 1650° C. of the outer cladding region is ≥1.1 to the viscosity at 1650° C. of at least one of the core region, the inner cladding region and the depressed cladding region.

12. The fiber according to claim 4, wherein the ratio in viscosity at 1650° C. of the outer cladding region is ≥1.1 to the viscosity at 1650° C. of the core region.

13. The fiber according to claim 1, wherein the first cladding region comprises (a) an inner cladding region that surrounds the core region and has a relative refractive index, $\Delta_2$, and (b) an outer cladding region that surrounds the inner cladding region, has a relative refractive index, $\Delta_5$ and comprises undoped silica or silicon oxynitride; the core region has a relative refractive index, $\Delta_1$; $\Delta_1 \geq \Delta_2$; and $\Delta_5 > \Delta_2$.

14. The fiber according to claim 13, wherein the fiber further comprises a 22 m cable cutoff of ≤1260 nm.

15. The fiber according to claim 13, wherein the fiber further comprises a zero dispersion wavelength between 1300 nm and 1324 nm.

16. An optical fiber, comprising:
a fiber having an attenuation of less than about 0.17 dB/km at a wavelength of 1550 nm, the fiber comprising:
a core region in the fiber having a graded refractive index profile with an alpha of greater than 0.5, the core region further comprises a relative refractive index, $\Delta_1$, of about −0.20% to about +0.1% compared to pure silica; and
a first cladding region in the fiber that surrounds the core region,
wherein the core region comprises silica co-doped with fluorine and chlorine, and
further wherein the fiber comprises a mode field diameter (MFD) from about 8.2 μm to about 9.5 μm at 1310 nm.

17. The fiber according to claim 16, wherein the fiber further comprises a macrobend loss at 1550 nm of ≤1.5 dB/turn on a 20 mm diameter mandrel.

18. The fiber according to claim 16, wherein the fiber further comprises a macrobend loss at 1550 nm of ≤5 dB/turn on a 15 mm diameter mandrel.

19. The fiber according to claim 16, wherein the fiber further comprises a macrobend loss at 1550 nm of ≤0.025 dB/turn on a 30 mm diameter mandrel.

20. The fiber according to claim 16, wherein the fiber further comprises a macrobend loss at 1550 nm of ≤0.01 dB/turn on a 30 mm diameter mandrel.

21. The fiber according to claim 16, wherein the fiber further comprises a macrobend loss at 1550 run of ≤0.005 dB/turn on a 30 mm diameter mandrel.

22. The fiber according to claim 16, wherein the fiber further comprises a 22 m cable cutoff of ≤1260 nm.

23. The fiber according to claim 16, wherein the fiber further comprises a zero dispersion wavelength between 1300 nm and 1324 nm.

24. An optical fiber, comprising:
a fiber having an attenuation of less than about 0.17 dB/km at a wavelength of 1550 nm, the fiber comprising:
a core region in the fiber having a graded refractive index profile with an alpha of greater than 0.5, the core region further comprises a relative refractive index, $\Delta_1$, of about −0.20% to about +0.1% compared to pure silica; and
a first cladding region in the fiber that surrounds the core region,
wherein the core region comprises silica co-doped with fluorine and chlorine, and
further wherein the fiber comprises a mode field diameter (MFD) from about 9.0 μm to about 14 μm at 1550 nm.

25. The fiber according to claim 24, wherein the fiber further comprises a 22 μm cable cutoff of ≤1260 nm.

26. The fiber according to claim 24, wherein the fiber further comprises a macrobend loss at 1550 nm of ≤1.5 dB/turn on a 20 mm diameter mandrel.

27. The fiber according to claim 24, wherein the fiber further comprises a macrobend loss at 1550 nm of ≤0.5 dB/turn on a 20 mm diameter mandrel.

28. The fiber according to claim 24, wherein the fiber further comprises a dispersion at 1550 nm of less than or equal to about 22 ps/nm/km.

\* \* \* \* \*

UNITED STATES PATENT AND TRADEMARK OFFICE
CERTIFICATE OF CORRECTION

PATENT NO. : 10,150,695 B2
APPLICATION NO. : 15/689648
DATED : December 11, 2018
INVENTOR(S) : Dana Craig Bookbinder et al.

Page 1 of 1

It is certified that error appears in the above-identified patent and that said Letters Patent is hereby corrected as shown below:

In the Claims

Column 26, Line 8, Claim 13, delete "$\Delta_5$and" and insert -- $\Delta_5$ and --, therefor.

Column 26, Line 10, Claim 13, delete "$\Delta_5$; >$\Delta_2$." and insert -- $\Delta_5$ >$\Delta_2$. --, therefor.

Column 26, Line 67, Claim 25, delete "22 µm" and insert -- 22 m --, therefor.

Signed and Sealed this
Second Day of June, 2020

Andrei Iancu
*Director of the United States Patent and Trademark Office*